United States Patent
Tanaka et al.

(10) Patent No.: US 8,498,293 B2
(45) Date of Patent: *Jul. 30, 2013

(54) MECHANISM FOR ENABLING LAYER TWO HOST ADDRESSES TO BE SHIELDED FROM THE SWITCHES IN A NETWORK

(75) Inventors: Bert H. Tanaka, Saratoga, CA (US); Joseph R. Mihelich, Folsom, CA (US)

(73) Assignee: Fortinet, Inc., Sunnyvale, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 13/154,617

(22) Filed: Jun. 7, 2011

(65) Prior Publication Data

US 2011/0235639 A1    Sep. 29, 2011

Related U.S. Application Data

(63) Continuation of application No. 12/255,972, filed on Oct. 22, 2008, now Pat. No. 7,957,374.

(51) Int. Cl.
*H04L 12/28* (2006.01)
*G06F 15/173* (2006.01)

(52) U.S. Cl.
USPC ............ 370/390; 370/392; 370/402; 709/225

(58) Field of Classification Search
USPC ................. 370/389–392, 395–401, 455–465; 709/229–245
See application file for complete search history.

(56) References Cited

U.S. PATENT DOCUMENTS

| | | | |
|---|---|---|---|
| 6,188,694 B1 * | 2/2001 | Fine et al. | 370/402 |
| 6,618,398 B1 | 9/2003 | Marchetti et al. | |
| 7,155,740 B2 * | 12/2006 | Brustoloni | 726/15 |
| 7,286,537 B2 * | 10/2007 | Roh | 370/392 |
| 7,330,456 B2 | 2/2008 | Yeh | |
| 7,421,736 B2 * | 9/2008 | Mukherjee et al. | 726/15 |
| 7,606,902 B2 * | 10/2009 | Rao et al. | 709/225 |
| 7,616,635 B2 | 11/2009 | Slaight | |
| 7,769,004 B2 * | 8/2010 | Johnson et al. | 370/389 |
| 7,826,462 B2 | 11/2010 | Kawal et al. | |
| 7,957,374 B2 | 6/2011 | Tanaka | |
| 8,125,996 B2 | 2/2012 | Tanaka | |
| 2003/0154306 A1 * | 8/2003 | Perry | 709/245 |

(Continued)

OTHER PUBLICATIONS

"Network Address Translation." Wikipedia, the Free Encyclopedia, dated Sep. 9, 2008. 8 pages.

(Continued)

*Primary Examiner* — Man Phan

(74) *Attorney, Agent, or Firm* — Hamilton, DeSanctis & Cha LLP

(57) ABSTRACT

Methods and systems for shielding layer two host addresses (e.g., MAC addresses) from a network are provided. A border component interposed between a network of switches and multiple local hosts receives from a first local host a first packet destined for a first destination host. The first local host has a first layer 2 (L2) address and a first layer 3 (L3) address associated therewith. The first packet includes the first L2 address as a source L2 address for the first packet, and includes the first L3 address as a source L3 address for the first packet. The border component shields the first L2 address from the network of switches by replacing the source L2 address for the first packet with a substitute L2 address associated with a communication channel of the border component before sending the first packet to the network of switches.

46 Claims, 8 Drawing Sheets

U.S. PATENT DOCUMENTS

| | | | |
|---|---|---|---|
| 2006/0037071 A1* | 2/2006 | Rao et al. | 726/13 |
| 2006/0039356 A1* | 2/2006 | Rao et al. | 370/352 |
| 2007/0233825 A1 | 10/2007 | Brownell et al. | |
| 2008/0209071 A1 | 8/2008 | Kubota | |
| 2008/0219187 A1 | 9/2008 | Zou | |
| 2010/0002693 A1* | 1/2010 | Rao et al. | 370/389 |
| 2010/0005288 A1* | 1/2010 | Rao et al. | 713/151 |
| 2010/0098073 A1 | 4/2010 | Tanaka | |
| 2010/0281181 A1* | 11/2010 | Johnson et al. | 709/245 |
| 2011/0078331 A1 | 3/2011 | Tanaka | |

OTHER PUBLICATIONS

The RFC Archive, RFC #3022, entitled Traditional IP Network Address Translator (Traditional NAT), dated Mar. 25, 2009. 15 pages.

"Address Resolution Protocol."—Wikipedia, the Free Encyclopedia, dated Sep. 9, 2008. 5 pages.

RFC 826, entitled "An Ethernet Address Resolution Protocol"—or "Converting Network Protocol Addresses." by David C. Plummer, dated Nov. 1982. 12 pages.

Non-Final Office Action for U.S. Appl. No. 12/255,972 mailed on Feb. 17, 2011.

Non-Final Office Action for U.S. Appl. No. 12/960,519 mailed Nov. 28, 2011.

Notice of Allowance for U.S. Appl. No. 12/960,519 mailed Jan. 23, 2012.

Restriction Requirement for U.S. Appl. No. 12/255,972 mailed Aug. 10, 2010.

* cited by examiner

| Snd IP=a | Snd MAC=A | Tgt IP=x | Tgt MAC= | op=1 | Src MAC=A | Dest MAC=BCST |

*Fig. 4A*

| Snd IP=a | Snd MAC=CC1 | Tgt IP=x | Tgt MAC= | op=9 | Src MAC=CC1 | Dest MAC=BCST |

*Fig. 4B*

| Snd IP=e | Snd MAC=E | Tgt IP=z | Tgt MAC= | op=1 | Src MAC=E | Dest MAC=BCST |

*Fig. 5A*

| Snd IP=e | Snd MAC=CC1 | Tgt IP=z | Tgt MAC= | op=9 | Src MAC=CC1 | Dest MAC=BCST |

*Fig. 5B*

| Snd IP=a | Snd MAC=A | Tgt IP=x | Tgt MAC= | op=1 | Src MAC=A | Dest MAC=BCST |

*Fig. 6A*

| Snd IP=a | Snd MAC=CC1 | Tgt IP=x | Tgt MAC= | op=1 | Src MAC=CC1 | Dest MAC=BCST |

*Fig. 6B*

| Snd IP=x | Snd MAC=X | Tgt IP=a | Tgt MAC=CC1 | op=2 | Src MAC=X | Dest MAC=CC1 |

*Fig. 6C*

| Snd IP=x | Snd MAC=CC4 | Tgt IP=a | Tgt MAC=CC1 | op=10 | Src MAC=CC4 | Dest MAC=CC1 |

*Fig. 6D*

| Snd IP=x | Snd MAC=CC4 | Tgt IP=a | Tgt MAC=A | op=2 | Src MAC=CC4 | Dest MAC=A |

*Fig. 6E*

| Snd IP=e | Snd MAC=E | Tgt IP=z | Tgt MAC= | op=1 | Src MAC=E | Dest MAC=BCST | Fig. 7A |
| Snd IP=e | Snd MAC=CC1 | Tgt IP=z | Tgt MAC= | op=1 | Src MAC=CC1 | Dest MAC=BCST | Fig. 7B |
| Snd IP=z | Snd MAC=Z | Tgt IP=e | Tgt MAC=CC1 | op=2 | Src MAC=Z | Dest MAC=CC1 | Fig. 7C |
| Snd IP=z | Snd MAC=CC4 | Tgt IP=e | Tgt MAC=CC1 | op=10 | Src MAC=CC4 | Dest MAC=CC1 | Fig. 7D |
| Snd IP=z | Snd MAC=CC4 | Tgt IP=e | Tgt MAC=E | op=2 | Src MAC=CC4 | Dest MAC=E | Fig. 7E |
| Snd IP=c | Snd MAC=C | Tgt IP=z | Tgt MAC= | op=1 | Src MAC=C | Dest MAC=BCST | Fig. 8A |
| Snd IP=c | Snd MAC=CC1 | Tgt IP=z | Tgt MAC= | op=9 | Src MAC=CC1 | Dest MAC=BCST | Fig. 8B |
| Snd IP=z | Snd MAC=CC4 | Tgt IP=c | Tgt MAC=CC1 | op=10 | Src MAC=CC4 | Dest MAC=CC1 | Fig. 8C |
| Snd IP=z | Snd MAC=CC4 | Tgt IP=c | Tgt MAC=C | op=2 | Src MAC=CC4 | Dest MAC=C | Fig. 8D |

| Snd IP=c | Snd MAC=C | Tgt IP=z | Tgt MAC= | op=1 | Src MAC=C | Dest MAC=BCST |

Fig. 9A

| Snd IP=c | Snd MAC=CC1 | Tgt IP=z | Tgt MAC= | op=9 | Src MAC=CC1 | Dest MAC=BCST |

Fig. 9B

| Snd IP=c | Snd MAC=CC1 | Tgt IP=z | Tgt MAC= | op=1 | Src MAC=CC1 | Dest MAC=z |

Fig. 9C

| Snd IP=z | Snd MAC=Z | Tgt IP=c | Tgt MAC=CC1 | op=2 | Src MAC=Z | Dest MAC=CC1 |

Fig. 9D

| Snd IP=z | Snd MAC=CC4 | Tgt IP=c | Tgt MAC=CC1 | op=10 | Src MAC=CC4 | Dest MAC=CC1 |

Fig. 9E

| Snd IP=z | Snd MAC=CC4 | Tgt IP=c | Tgt MAC=C | op=2 | Src MAC=CC4 | Dest MAC=C |

Fig. 9F

| Src IP=a | Src MAC=A | Dest IP=x | Dest MAC=CC4 |

Fig. 10A

| Src IP=a | Src MAC=CC1 | Dest IP=x | Dest MAC=CC4 |

Fig. 10B

| Src IP=a | Src MAC=CC1 | Dest IP=x | Dest MAC=X |

Fig. 10C

| Src IP=e | Src MAC=E | Dest IP=z | Dest MAC=CC4 |

Fig. 11A

| Src IP=e | Src MAC=CC1 | Dest IP=z | Dest MAC=CC4 |

Fig. 11B

| Src IP=e | Src MAC=CC1 | Dest IP=z | Dest MAC=Z |

Fig. 11C

| Src IP=x | Src MAC=X | Dest IP=a | Dest MAC=CC1 |

Fig. 12A

| Src IP=x | Src MAC=CC4 | Dest IP=a | Dest MAC=CC1 |

Fig. 12B

| Src IP=x | Src MAC=CC4 | Dest IP=a | Dest MAC=A |

Fig. 12C

| Src IP=z | Src MAC=Z | Dest IP=e. | Dest MAC=CC1 |

Fig. 13A

| Src IP=z | Src MAC=CC4 | Dest IP=e | Dest MAC=CC1 |

Fig. 13B

| Src IP=z | Src MAC=CC4 | Dest IP=e | Dest MAC=E |

Fig. 13C

MDS 204(1)

| L3 Address | L2 Address |
|---|---|
| IP=a | MAC=A |

MDS 204(n)

| L3 Address | L2 Address |
|---|---|
|  |  |

*Fig. 14A*

MDS 204(1)

| L3 Address | L2 Address |
|---|---|
| IP=a | MAC=A |
| IP=e | MAC=E |

MDS 204(n)

| L3 Address | L2 Address |
|---|---|
|  |  |

*Fig. 14B*

MDS 204(1)

| L3 Address | L2 Address |
|---|---|
| IP=a | MAC=A |
| IP=e | MAC=E |

MDS 204(n)

| L3 Address | L2 Address |
|---|---|
| IP=x | MAC=X |

*Fig. 14C*

MDS 204(1)

| L3 Address | L2 Address |
|---|---|
| IP=a | MAC=A |
| IP=e | MAC=E |

MDS 204(n)

| L3 Address | L2 Address |
|---|---|
| IP=x | MAC=X |
| IP=z | MAC=Z |

*Fig. 14D*

MDS 204(1)

| L3 Address | L2 Address |
|---|---|
| IP=a | MAC=A |
| IP=e | MAC=E |
| IP=c | MAC=C |

MDS 204(n)

| L3 Address | L2 Address |
|---|---|
| IP=x | MAC=X |
| IP=z | MAC=Z |

*Fig. 14E*

MECHANISM FOR ENABLING LAYER TWO HOST ADDRESSES TO BE SHIELDED FROM THE SWITCHES IN A NETWORK

CROSS-REFERENCE TO RELATED APPLICATIONS

This application is a continuation of U.S. patent application Ser. No. 12/255,972, filed on Oct. 22, 2008, now U.S. Pat. No. 7,957,374, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2008-2011, Fortinet, Inc.

BACKGROUND

1. Field

Embodiments of the present invention generally relate to network interconnect technologies, such as Ethernet networks. In particular, embodiments of the present invention relate to improving network scalability.

2. Description of the Related Art

Over the past several years, the computing and storage server industries have been migrating towards a network-based computing and storage model to take advantage of lower cost, high-performance commodity processors and lower cost, high-density storage media. This server industry trend has created a need for a highly scalable interconnect technology to enable the various computing and storage resources to be efficiently and effectively coupled. One type of interconnect that has been considered for this purpose is an Ethernet network.

An Ethernet network is a loop-free switching path, reverse path learning network. By "loop-free", it is meant that there is only one path between any pair of hosts (e.g. nodes) in the network. Because of this loop-free property, it is possible for the switches in an Ethernet network to forward packets by broadcast flooding, and to populate their forwarding tables through reverse path learning.

Specifically, when an Ethernet switch encounters a packet with a destination host address that it does not have in its forwarding table, the switch broadcasts that packet on all outgoing links, except for the link on which the packet was received. All subsequent switches that receive the packet that do not have the destination host address in their forwarding tables do the same thing. Eventually, the packet will be delivered to the destination host. Because there is only one path to the destination host, it is assured that broadcasting the packet in this way will not create an infinite loop of broadcasts.

In addition to broadcasting the packet, a switch also determines, from the packet, the address of the source host that sent the packet. It also notes the link on which the packet was received. This address and link association is stored in the forwarding table of the switch. In the future, if the switch receives a packet having the address of the source host as the destination address, it will know, based upon the address and link association in the forwarding table, which link to switch the packet to. It will not need to broadcast the packet. In this way, an Ethernet switch learns the reverse path of a packet. Because of this reverse path learning capability, it is not necessary to pre-configure the forwarding tables of Ethernet switches. The switches can build these forwarding tables on the fly. This self learning capability of Ethernet switches is a key "plug and play" attribute of an Ethernet network, and is one of the reasons why Ethernet is so widely deployed.

As noted above, a switch stores in its forwarding table an address and link association for each source host address that it encounters. Because a forwarding table can store only so many entries, the number of host addresses that it can accommodate is limited. This in turn limits the number of hosts that can be accommodated by the overall network (since each host has its own unique address). Thus, the scalability of Ethernet networks is currently limited by the size of the forwarding tables in the switches.

This limited scalability has been made even worse by recent developments, which have caused the number of hosts (and hence, the number of host addresses) to proliferate. These developments include the sharing of a large capacity link by multiple hosts, and the advent of virtual machines. In the link sharing context, a single high capacity link (e.g. a 10G bit link) is shared by a relatively large number of hosts, each of which is allocated a small portion of the link's capacity (e.g. ten hosts, each allocated 1G bit). Because of the sharing, the link has not just one host but multiple hosts coupled to it. This in turn means that the link will have multiple host addresses associated therewith. As a result, the switches in the network will need to store multiple host addresses in their forwarding tables to accommodate the packets going to and coming from that link. If a fair number of the links in the network are shared links, thereby meaning that a fair number of the links have multiple host addresses associated therewith, the storage capacity of the forwarding tables of the switches in the network will be quickly consumed. This can lead to the network being unable to accommodate all of the hosts that are coupled to it.

Virtual machines create the same problem. The concept behind virtual machines is that a single physical machine can be transformed into multiple virtual or logical machines. Each virtual machine acts as a separate machine and has its own unique address. A single physical machine can be transformed into any desired number of virtual machines. Thus, if a physical machine is transformed into a large number of virtual machines, and if that physical machine is coupled to a link (thereby meaning that all of the virtual machines are coupled to that link), then the link will have a large number of virtual hosts and, hence, a large number of host addresses associated therewith. This in turn means that the switches in the network will need to store multiple host addresses in their forwarding tables to accommodate the packets going to and coming from that link. As was the case with shared links, this can cause the storage capacity of the forwarding tables of the switches in the network to be quickly and completely consumed, which can lead to the network being unable to accommodate all of the hosts that are coupled to it. Overall, the proliferation of host addresses can significantly reduce the scalability of an Ethernet network.

SUMMARY

Methods and systems are described for shielding layer two host addresses (e.g., MAC addresses) from a network. A border component interposed between a network of switches and multiple local hosts receives from a first local host a first packet destined for a first destination host. The first local host has a first layer 2 (L2) address and a first layer 3 (L3) address associated therewith. The first packet includes the first L2 address as a source L2 address for the first packet, and includes the first L3 address as a source L3 address for the first packet. The border component shields the first L2 address from the network of switches by replacing the source L2 address for the first packet with a substitute L2 address associated with a communication channel of the border component before sending the first packet to the network of switches.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIGS. 4A-4B show some sample packet headers used in connection with sending an address request packet, in accordance with one embodiment of the present invention.

FIGS. 5A-5B show some additional sample packets used in connection with sending an address request packet, in accordance with one embodiment of the present invention.

FIGS. 6A-6E show some sample packet headers used in connection with sending an address request packet and receiving a reply packet, in accordance with one embodiment of the present invention.

FIGS. 7A-7E show some additional sample packet headers used in connection with sending an address request packet and receiving a reply packet, in accordance with one embodiment of the present invention.

FIGS. 8A-8D show some additional sample packet headers used in connection with sending an address request packet and receiving a reply packet, in accordance with one embodiment of the present invention.

FIGS. 9A-9F show some additional sample packet headers used in connection with sending an address request packet and receiving a reply packet, in accordance with one embodiment of the present invention.

FIGS. 10A-10C show some sample packet headers used in connection with sending a data packet, in accordance with one embodiment of the present invention.

FIGS. 11A-11C show some additional sample packet headers used in connection with sending a data packet, in accordance with one embodiment of the present invention.

FIGS. 12A-12C show some additional sample packet headers used in connection with sending a data packet, in accordance with one embodiment of the present invention.

FIGS. 13A-13C show some additional sample packet headers used in connection with sending a data packet, in accordance with one embodiment of the present invention.

FIGS. 14A-14E shown the manner in which some mapping data structures may be updated with information, in accordance with one embodiment of the present invention.

DETAILED DESCRIPTION

Terminology

In the following discussion, reference will be made to layer two (L2) and layer 3 (L3) addresses. As used herein, layer two refers to the second layer (known as the data link or switching layer) of the seven-layer OSI (open systems interconnection) model of networking, and layer three refers to the third layer (known as the network or routing layer) of the OSI model. For illustrative purposes, it will be assumed herein that the L2 addresses are MAC (media access control) addresses and the L3 addresses are IP (Internet protocol) addresses. However, it should be noted that for purposes of the present invention, other types of L2 and L3 addresses may be used, if so desired.

System Overview

Figure 1:
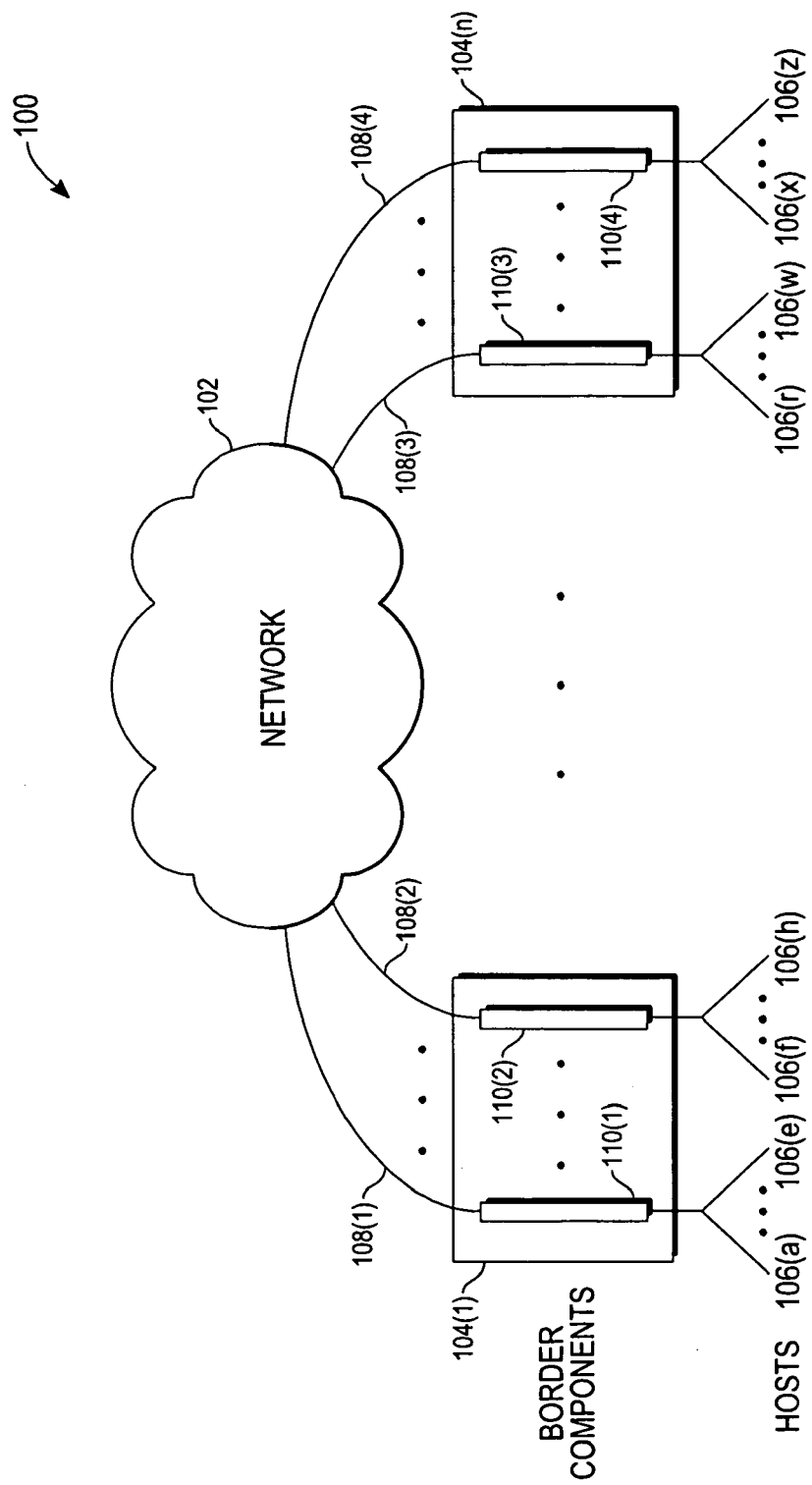
FIG. 1 is a high level diagram of a system in which one embodiment of the present invention may be implemented.

FIG. 1 shows a high level diagram of a system 100 in which one embodiment of the present invention may be implemented. As shown, the system 100 comprises a network 102, a plurality of border components 104(1)-104(n) coupled to the network 102, and a plurality of hosts 106(a)-106(z) coupled to the border components 104(1)-104(n). In FIG. 1, the letters included within the parenthesis of the reference numbers are used as variables to represent any desired integers. They are not meant to indicate any particular number or ordering. For example, while the hosts are labeled 106(a) through 106(z), this is not meant to indicate that there are twenty six (a through z) hosts in the system. Rather, there may be any desired number of hosts 106, there may be any desired number of border components 104, and the network 102 may have any desired number of links. The letters within the parenthesis are used merely for convenience and reference.

In one embodiment, the network 102 is a network of switches, not a network of routers. As such, the switches (not shown) within the network 102 forward packets from switch to switch based upon L2 addresses (e.g. MAC addresses). Unlike a network of routers, the network 102 does not forward packets based upon L3 (e.g. IP) addresses. The packets may include L3 addresses within them, but in one embodiment, these L3 addresses are not used by the network 102 to switch packets through the network 102. As will be described in detail in a later section, however, an L3 address in a packet may be used by a border component 104 to determine which L2 address to use to forward a packet received from the network 102 to a host 106. Because L2 addresses are the addresses that are used by the switches in the network 102 to forward packets, it will be these L2 addresses that are stored in the forwarding tables of the switches. That being the case, the fewer L2 addresses that are exposed to the switches, the fewer entries the switches will need to store in their forwarding tables. In accordance with this observation, the border components 104(1)-104(n), in one embodiment, shield the L2 addresses of the hosts 106(a)-106(z) from the switches of the network 102 to minimize the number of L2 addresses that the switches have to store in their forwarding tables. This will be elaborated upon in a later section. Doing so enables the scalability of the network to be improved.

As shown in FIG. 1, the border components 104(1)-104(n) are interposed between the network 102 and the hosts 106(a)-106(z). In one embodiment, the border components 104(1)-104(n) are situated at the border of the network 102. By this, it is meant that the border components 104(1)-104(n) are coupled to the links 108(1)-108(4) at the edge of the network 102 that are intended to be used by external components to connect to the network 102. The edge links 108(1)-108(4), which are coupled to corresponding switches in the network 102, are usually used by hosts to connect to the network 102, but in the embodiment shown in FIG. 1, the edge links 108 (1)-108(4) are coupled to the border components 104(1)-104 (n), which in turn, are coupled to the hosts 108(a)-108(z). Interposing the border components 104(1)-104(n) between the network 102 and the hosts 108(a)-108(z) in this manner enables the border components to process packets from the hosts 108(a)-108(z) before they enter the network 102, and to process packets from the network 102 before they are forwarded to the hosts 108(a)-108(z).

In one embodiment, the border components 104(1)-104(n) are coupled to the network 102 and the hosts 106(a)-106(z) via communication channels 110(1)-110(4). A communication channel enables bi-directional communication at both ends of the channel. For example, communication channel 110(1) allows the border component 104(1) to send packets to and to receive packets from the network 102. In addition, communication channel 110(1) allows the border component 104(1) to send packets to and to receive packets from the hosts 106(a)-106(e) that are coupled to communication channel 110(1). Thus, communication channel 110(1) acts as a bi-directional conduit for facilitating the exchange of packets between hosts 106(a)-106(e) and the network 102. In one embodiment, each of the communication channels 110(1)-110(4) has a unique L2 address associated therewith.

One or more hosts may be coupled to each of the communication channels 110(1)-110(4). As shown in FIG. 1, hosts 106(a)-106(e) are coupled to communication channel 110(1), hosts 106(f)-106(h) are coupled to communication channel 110(2), hosts 106(r)-106(w) are coupled to communication channel 110(3), and hosts 106(x)-106(z) are coupled to communication channel 110(4). For purposes of the present invention, a host may be any type of component that can send packets to and/or receive packets from a network, including but certainly not limited to a client computer, a server computer, a virtual machine, a switch, a router, etc. In one embodiment, each of the hosts 106(a)-106(z) has a unique L2 address associated therewith. Because there may be a large number of hosts, it is desirable, in one embodiment, to shield the actual L2 addresses of the hosts from the switches in the network 102. That way, the number of L2 addresses that need to be stored in the forwarding tables of the switches can be kept to a minimum. In one embodiment, the task of shielding the L2 addresses of the hosts from the network 102 is performed by the border components 104(1)-104(n).

To illustrate how this may be done, reference will be made to an example involving communication channel 110(1). As noted previously, communication channel 110(1) has a unique L2 address associated therewith. For the sake of example, it will be assumed that this L2 address is a MAC address designated as CC1. When the border component 104(1) receives a packet on communication channel 110(1) from any of the hosts 106(a)-106(e) coupled to communication channel 110(1), the border component 104(1) changes the source L2 address specified in the packet from the actual L2 address of the sending host to the L2 address (CC1) of communication channel 110(1). That way, when the packet is sent to the network 102, it will appear to the switches in the network 102 as if the source of the packet were communication channel 110(1). The border component 104(1) will perform this source L2 address replacement (i.e. replace the actual L2 address of the sending host with CC1) for packets received from any of the hosts 106(a)-106(e) coupled to communication 110(1). Thus, the L2 address CC1 of communication channel 110(1) is in effect "shared" by all of the hosts 106(a)-106(e). Since the switches in the network 102 see only this L2 address CC1 instead of the actual L2 addresses of the hosts 106(a)-106(e), the switches will store only this L2 address into their forwarding tables. The actual L2 addresses of the hosts 106(a)-106(e) will not be stored in the forwarding tables of the switches. Thus, by shielding the actual L2 addresses of the hosts from the switches of the network 102, the border components reduce the number of L2 addresses that need to be stored in the forwarding tables of the switches in the network 102. This in turn improves the scalability of the overall network. The manner in which the border components operate in accordance with one embodiment of the present invention will be elaborated upon in a later section.

Border Component

Figure 2:
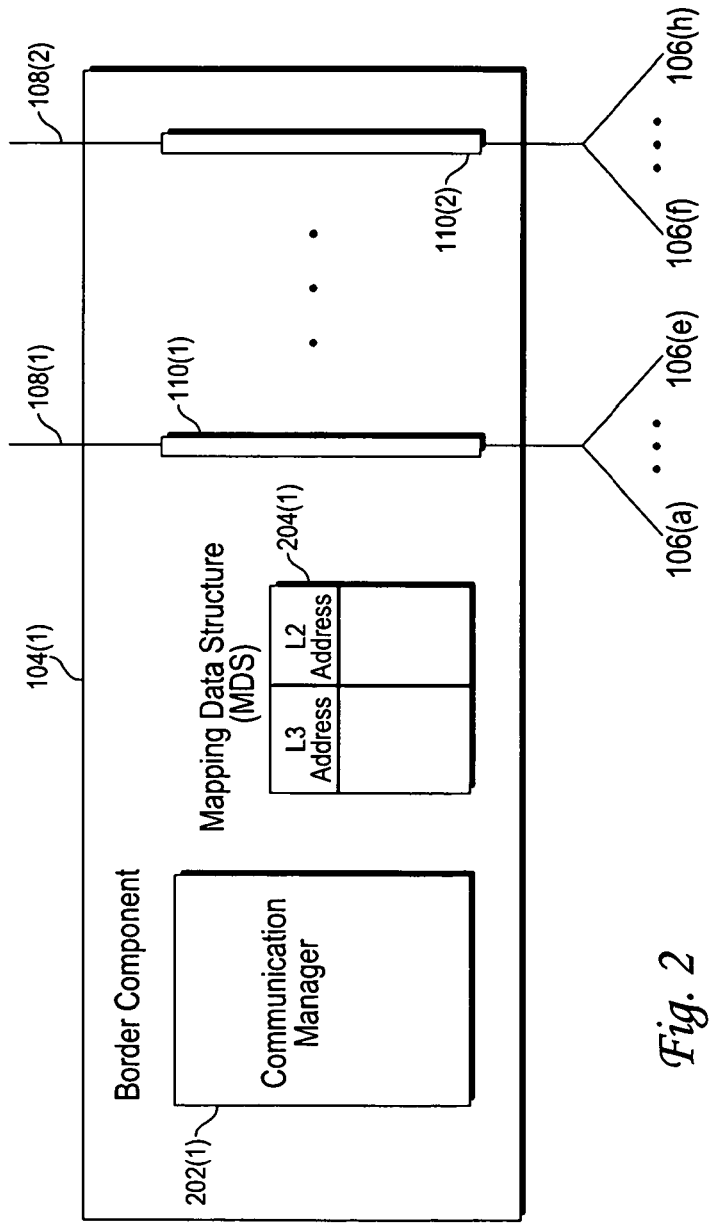
FIG. 2 is a detailed diagram of a border component, in accordance with one embodiment of the present invention.

FIG. 2 shows the border component 104(1) in greater detail, in accordance with one embodiment of the present invention. The other border components 104 in the system 100 may have similar construction. As shown, border component 104(1) comprises a communication manager 202(1), a mapping data structure (MDS) 204(1), and a plurality of communication channels including communication channels 110(1) and 110(2), which are coupled to hosts 106(a)-106(e) and hosts 106(f)-106(h), respectively. The communication channels 110(1) and 110(2) are also coupled to edge links 108(1) and 108(2), respectively. In one embodiment, it is the communication manager 202(1) that performs the functions that have been and that will be described for border component 104(1). For purposes of the present invention, the communication manager 202(1) may be realized using hardware (e.g. hardware logic components, ASICs, etc.), software (e.g. having one or more processors execute one or more sets of instructions), or a combination thereof. In one embodiment, the functionalities of the communication manager 202(1) that are time critical are implemented in hardware. The functionalities that are not time critical are implemented in software. However, this is just one possible embodiment. For purposes of the present invention, any desired implementation (hardware, software, combination thereof) can be used.

In performing its functions, the communication manager 202(1), in one embodiment, makes use of MDS 204(1). As will be explained in a later section, the information in MDS 204(1) is used by the communication manager 202(1) to determine which L2 address to use to forward a packet destined for one of the hosts 106(a)-106(h). In one embodiment, the MDS 204(1) takes the form of a table having at least two columns: (1) a L3 address column; and (2) a L2 address column. The L3 address column stores the L3 address of a host, and the L2 address column stores the L2 address for that host. In one embodiment, there is an entry in MDS 204(1) for each of the hosts 106(a)-106(h) coupled to the border component 104(1). For example, the MDS 204(1) may have an entry for host 106(a) that includes the L3 address of host 106(a) and the L2 address of host 106(a). Similarly, the MDS 204(1) may have an entry for host 106(h) that includes the L3 address of host 106(h) and the L2 address of host 106(h). This information enables the communication manager 202(1) to determine which L3 address is associated with which L2 address, thereby enabling the communication manager 202(1) to map an L3 address to an L2 address, and vice versa. In one embodiment, the MDS 204(1) is populated by the communication manager 202(1) as packets are sent by the hosts 106(a)-106(h). Specifically, the communication manager 202(1) "reverse path learns" the mapping information from the packets sent by the hosts 106(a)-106(h). This will be explained further in a later section.

Sample Operation

Figure 3:
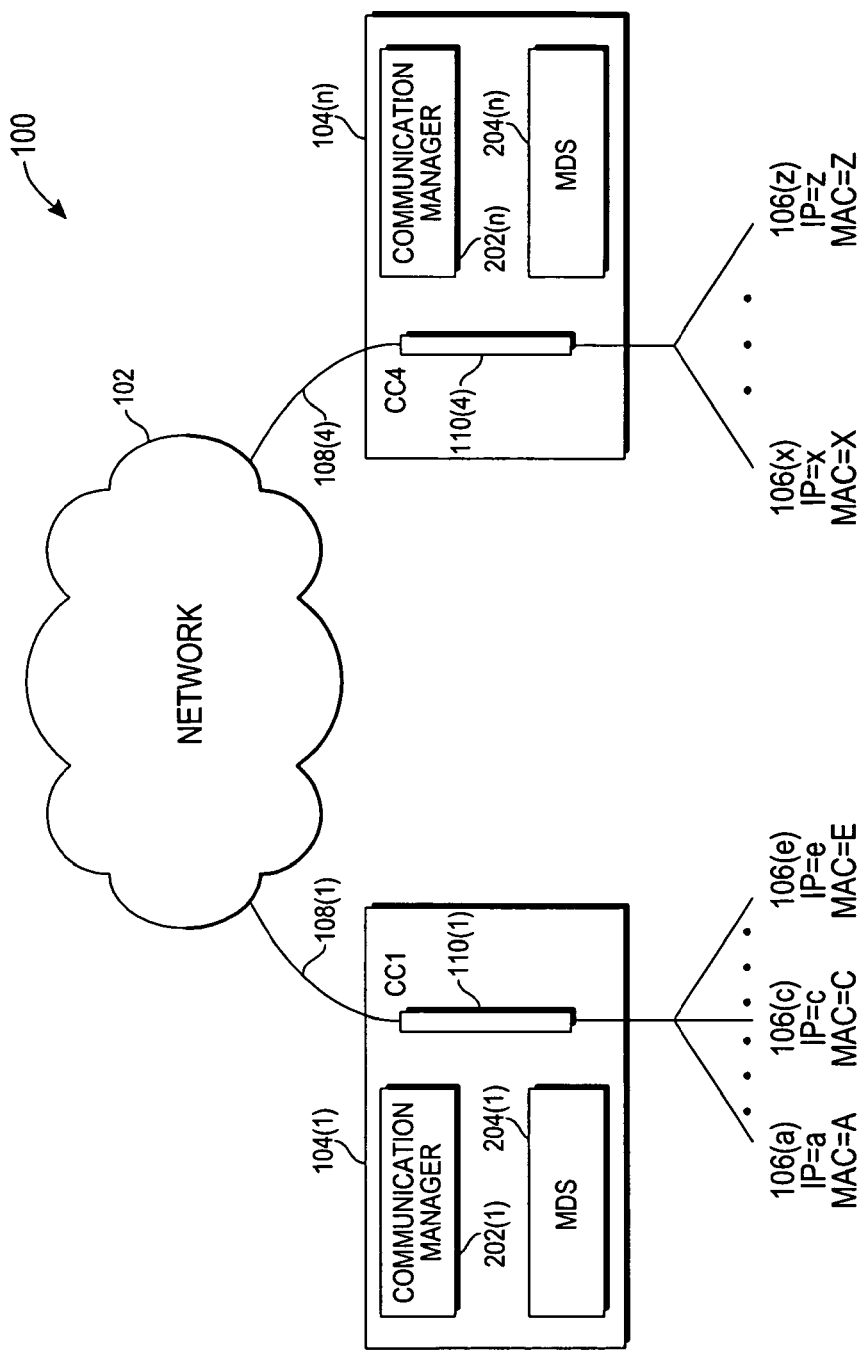
FIG. 3 is a slightly modified version of the system diagram of FIG. 1.

With the above information in mind, a sample operation of the system in accordance with one embodiment of the present invention will now be described. In the following discussion, reference will be made to FIG. 3, which is a slightly revised version of FIG. 1 (specifically, FIG. 3 has added communication managers 202(1) and 202(n), MDS 204(1) and 204(n), and host 106(c)). For purposes of illustration, it will be assumed in the following example that the L3 addresses are IP addresses and the L2 addresses are MAC addresses. In terms of nomenclature, IP addresses will be shown in lower case letters while MAC addresses are shown in upper case letters. For example, the IP address for host 106(a) will be shown as "a", while the MAC address for host 106(a) will be shown as "A". Similarly, the IP address for host 106(z) will be shown as "z", while the MAC address for host 106(z) will be shown as "Z".

Initialization

In the current example, it will be assumed that the system is just starting up and that no initialization has been performed. Thus, none of the switches in the network 102 have their forwarding tables populated and the MDSs 204(1) and 204(n) have not been populated. In such a situation, the hosts in the system, in one embodiment, carry out an address discovery process using a standard protocol known as the address resolution protocol (ARP). With this protocol, the hosts are able to ascertain the MAC addresses of the other hosts with which they wish to communicate.

Suppose that host 106(a) knows the IP address of host 106(x) and wishes to ascertain the MAC address of host 106(x). To do so, host 106(a) composes an address request packet. This address request packet may have a header such as that shown in FIG. 4A. The header indicates that: (1) the IP address of the sending host (i.e. the requesting host 106(a)) is "a"; (2) the MAC address of the sending host is "A"; (3) the IP address of the target host is "x"; (4) the MAC address of the target host is unknown and hence is being requested; (5) the packet is a standard ARP request packet (indicated by op code "1"); (6) the source MAC address for the packet is "A"; and (7) the destination MAC address is BCST (meaning that the packet is not destined for a specific MAC address but rather is to be broadcasted). After composing the address request packet, host 106(a) sends it to border component 104(1) via communication channel 110(1).

Upon receiving the address request packet via communication channel 110(1), the communication manager 202(1) on border component 104(1) performs several operations. First, it obtains from the packet the IP address and the MAC address of the host sending the packet, and uses this information to populate MDS 204(1). In the address request packet, the IP address and the MAC address of the sending host 106(a) are "a" and "A", respectively. Thus, this information is used by the communication manager 202(1) to populate MDS 204(1). The result is shown in FIG. 14A. In this manner, the communication manager 202(1) "reverse path learns" the IP address and MAC address of host 106(a). This information will be used in future processing.

In addition to updating MDS 204(1), communication manager 202(1) also determines the type of the packet. From op code "1", the communication manager 202(1) knows that this is a standard ARP request packet. In response to this determination, the communication manager 202(1), in one embodiment, stores some information in a storage (not shown) to indicate that a host having IP address "a" and MAC address "A" has sent an address request packet asking for a MAC address for a target host having IP address "x". That way, if the same host later sends another address request packet to request a MAC address for the same target host, the communication manager 202(1) will know that a previous address request packet had been sent. The significance of this will be made clear in a later section.

Furthermore, communication manager 202(1) updates the address request packet to derive an updated packet. The header of the updated packet is shown in FIG. 4B. Specifically, the communication manager 202(1) replaces the MAC address "A" of the sending host 106(a) with the MAC address "CC1" of the communication channel 110(1) (both in the Snd MAC field and the Src MAC field). By doing so, the communication manager 202(1) shields the MAC address "A" of host 106(a) from the network 102 and makes it appear as if the packet were being sent by communication channel 110(1). In addition, communication manager 202(1) changes the op code from "1" to "9". In one embodiment, the op code "9" indicates that the packet is still an address request packet but that it is a non-standard ARP request packet (an op code "9" packet will be referred to herein as a fabric ARP or FARP request packet). In one embodiment, standard ARP and FARP request packets are processed differently, as will be elaborated upon in a later section. In addition to these updates, the communication manager 202(1) may further update the packet with additional information, such as adding VLAN information as taught in U.S. application Ser. Nos. 11/056,436, 11/336,713, 11/732,601, and 11/732,599. These and other updates may be made to the address request packet.

After the address request packet is updated, it is sent by the communication manager 202(1), via communication channel 110(1), into the network 102. The packet will thereafter be broadcasted throughout the network 102, and the forwarding tables of the switches in the network 102 will be updated with the MAC address CC1 of the communication channel 110(1) (but not the MAC address "A" of host 106(a)). The address request packet of host 106(a) is thus processed and sent out.

Suppose now that host 106(e) also wants to send an address request packet. However, instead of targeting host 106(x), it is targeting host 106(z). In such a case, host 106(e) would compose an address request packet having a header such as that shown in FIG. 5A. The header indicates that: (1) the IP address of the sending host (i.e. the requesting host 106(e)) is "e"; (2) the MAC address of the sending host is "E"; (3) the IP address of the target host is "z"; (4) the MAC address of the target host is unknown and hence is being requested; (5) the packet is a standard ARP packet (indicated by op code "1"); (6) the source MAC address for the packet is "E"; and (7) the destination MAC address is BCST. After composing the address request packet, host 106(e) sends it to border component 104(1) via communication channel 110(1).

Upon receiving the address request packet via communication channel 110(1), the communication manager 202(1) on border component 104(1) performs the same operations as those described above. Namely, it obtains from the packet the IP address and the MAC address of the host sending the packet, and uses this information to populate MDS 204(1). In the address request packet, the IP address and the MAC address of the sending host 106(e) are "e" and "E", respectively. Thus, this information is used by the communication manager 202(1) to populate MDS 204(1). The result is shown in FIG. 14B. In this manner, the communication manager 202(1) "reverse path learns" the IP address and MAC address of host 106(e).

In addition to updating MDS 204(1), communication manager 202(1) also determines the type of the packet. From op code "1", the communication manager 202(1) knows that this is a standard ARP request packet. In response to this determination, the communication manager 202(1) stores information in the previously mentioned storage (not shown) to indicate that a host having IP address "e" and MAC address "E" has sent an address request packet asking for a MAC address for a target host having IP address "z".

Furthermore, communication manager 202(1) updates the address request packet to derive an updated packet. The header of the updated packet is shown in FIG. 5B. Specifically, the communication manager 202(1) replaces the MAC address "E" of the sending host 106(e) with the MAC address "CC1" of the communication channel 110(1) (both in the Snd MAC field and the Src MAC field). By doing so, the communication manager 202(1) shields the MAC address "E" of host 106(e) from the network 102 and makes it appear as if the packet were being sent by communication channel 110(1). In addition, communication manager 202(1) changes the op code from "1" to "9". These and other updates may be made to the address request packet. After the address request packet is updated, it is sent by the communication manager 202(1), via communication channel 110(1), into the network 102. The packet will thereafter be broadcasted throughout the network 102. Since the forwarding tables of the switches in the network 102 have already been updated with the MAC address CC1 of the communication channel 110(1), no new entry will be added to the forwarding tables as a result of this packet.

Because both address request packets were broadcasted, they will be received at some point by the communication manager 202(n) of border component 104(n) via communication channel 110(4). Upon receiving the updated address request packet (shown in FIG. 4B) originated by host 106(a), communication manager 202(n) determines the type of the packet. From the op code "9", communication manager 202(n) determines that the packet is a FARP request packet, not a standard ARP request packet. Upon seeing that the packet is a non-standard address request packet, communication manager 202(n) determines whether the target host having IP address "x" for which a MAC address is being sought is one of the hosts coupled to communication channel 110(4). In one embodiment, communication manager 202(n) makes this determination by checking MDS 204(n) to see if IP address "x" is referenced in any of the entries in MDS 204(n). In the current example, MDS 204(n) is empty (see FIG. 14B); thus, there are no entries that reference IP address "x". As a result, communication manager 202(n) concludes (incorrectly, due to lack of information) that the target host is not one of the hosts coupled to communication channel 110(4). In one embodiment, this conclusion causes communication manager 202(n) to drop the address request packet originated by host 106(a). Going through the same process, communication manager 202(n) also receives and drops the address request packet (shown in FIG. 5B) originated by host 106(e). Thus, neither host 106(a) nor host 106(e) receives a reply to their request.

That being the case, the hosts 106(a) and 106(e) will resend address request packets. To do so, host 106(a) again composes an address request packet. This packet has the header shown in FIG. 6A, which is identical to the header of the previous address request packet shown in FIG. 4A. Host 106(a) again sends this packet to border component 104(1) via communication channel 110(1).

Upon receiving the address request packet via communication channel 110(1), the communication manager 202(1) on border component 104(1) processes the packet and determines that this is the second address request packet being sent by a host having IP address "a" and MAC address "A" asking for a MAC address for a target host having IP address "x" (recall that the communication manager 202(1) had previously stored information in a storage to indicate that a host having IP address "a" and MAC address "A" had sent an address request packet asking for a MAC address for a target host having IP address "x"). From this determination, the communication manager 202(1) concludes that the host 106 (a) did not receive a reply to its first address request packet. As a result, communication manager 202(1) processes this packet differently. Like it did with the previous address request packet, the communication manager 202(1) updates this packet by replacing the MAC address "A" of the sending host 106(a) with the MAC address "CC1" of the communication channel 110(1) (both in the Snd MAC field and the Src MAC field) (see FIG. 6B). However, unlike the previous packet shown in FIG. 4B, the communication manager 202(1) does not change the op code from "1" to "9". Rather, it leaves the op code as "1", thereby indicating that the updated address request packet is still a standard ARP request packet. These and other updates may be made to the address request packet. After the address request packet is updated, it is sent by the communication manager 202(1), via communication channel 110(1), into the network 102, and the packet is thereafter broadcasted throughout the network 102, eventually reaching border component 104(n) via communication channel 110 (4).

Upon receiving the updated address request packet via communication channel 110(4), the communication manager 202(n) on border component 104(n) determines from the op code "1" in the packet that the packet is a standard ARP request packet. In one embodiment, the communication manager 202(n) processes a standard ARP request packet by broadcasting it, without modification, to all of the hosts coupled to the communication channel on which the packet was received. Thus, in the current example, communication manager 202(n) broadcasts the packet to hosts 106(x)-106(z).

Upon receiving the packet, host 106(x) recognizes from the op code "1" that the packet is a standard ARP request packet, and recognizes from the target IP address "x" that the packet is requesting its (host 106(x)'s) MAC address. Thus, host 106(x) updates the request packet to compose a reply packet (see FIG. 6C). Specifically, host 106(x) takes the IP address "a" in the Snd IP field of the request packet (FIG. 6B) and puts it into the Tgt IP field of the reply packet (FIG. 6C), and takes the MAC address "CC1" in the Snd MAC field of the request packet and puts it into the Tgt MAC field and the Dest MAC field of the reply packet. This serves to direct the reply packet back to the sender of the request packet. In addition to doing this, host 106(x) further derives the reply packet by inserting its IP address "x" into the Snd IP field, inserting its MAC address "X" into the Snd MAC field, and replacing the MAC address "CC1" currently in the Src MAC field with its own MAC address "X". By doing so, host 106(x) provides its MAC address (which is being requested by the request packet), and indicates that the sender of the reply packet has IP address "x" and MAC address "X". Furthermore, host 106(x) changes the op code from "1" to "2" to indicate that the packet is now a standard ARP reply packet. Once that is done, host 106(x) sends the reply packet to border component 104 (n) via communication channel 110(4).

In addition to composing and sending the reply packet, the host 106(x) also obtains from the request packet (FIG. 6B) the IP address "a" from the Snd IP field and the MAC address "CC1" from the Snd MAC field. In the future, should the host 106(x) wish to send a packet to host 106(a), it will use IP address "a" and MAC address "CC1" to direct a packet to host 106(a). Notice that as a result of the border components 104(1), 104(n) replacing actual host MAC addresses with the MAC addresses CC1, CC4 of the communication channels, the host 106(x) believes that the MAC address for host 106(a) is "CC1" instead of "A". Thus, not only are the actual MAC addresses of the hosts shielded from the network 102, they are shielded from the other hosts as well.

The communication manager 202(n) receives, via communication channel 110(4), the reply packet from host 106(x). From op code "2", communication manager 202(n) knows that this is a standard ARP reply packet. Based upon this knowledge, the communication manager 202(n) operates as follows. First, it obtains the IP address "x" from the Snd IP field and the MAC address "X" from the Snd MAC field. Knowing that these represent the IP address and the MAC address for the host 106(x) that sent the reply packet, the communication manager 202(n) uses these addresses to update MDS 204(n). The result is shown in FIG. 14C. The communication manager 202(n) thus "reverse path learns" the IP and MAC addresses for host 106(x).

In addition to updating MDS 204(n), communication manager 202(n) also updates the reply packet to derive an updated reply packet. As shown in FIG. 6D, the communication manager 202(n) replaces the MAC address "X" of host 106(x) with the MAC address "CC4" of communication channel 110(4) (this is done in both the Snd MAC field and the Src MAC field). This serves to shield the actual MAC address of host 106(x) from the network 102 and the other hosts, and to make it appear as if the reply packet were being sent by communication channel 110(4). In addition, communication manager 202(n) changes the op code from "2" to "10" to indicate that the updated reply packet is no longer a standard ARP reply packet (the op code "10" indicates that the updated reply packet is a FARP reply packet). These and other updates may be made to the reply packet. After the reply packet is updated, it is sent by the communication manager 202(n) into the network 102 via communication channel 110(4). Since the network 102 has already "reverse path learned" the path back to communication channel 110(1), the updated reply packet will be properly switched to border component 104(1). Also, this updated reply packet will cause the switches in the network 102 to update their forwarding tables to include the MAC address CC4 of communication channel 110(4), thereby "reverse path learning" the way back to communication channel 110(4).

Upon receiving the updated reply packet via communication channel 110(1), the communication manager 202(1) on border component 104(1) sees from the op code "10" that the updated reply packet is a FARP reply packet. Accordingly, the communication manager 202(1) processes the packet as follows. First, it determines which host 106(a)-106(e) the packet should be directed to. To make this determination, the communication manager 202(1) obtains from the Tgt IP field of the updated reply packet the IP address "a" of the host that sent the original address request packet to which this packet is a reply. The communication manager 202(1) then accesses MDS 204(1) to see if there is any entry that references this IP address "a". As shown in FIG. 14C, MDS 204(1) contains an entry that maps IP address "a" to MAC address "A". From this, communication manager 202(1) determines that the updated reply packet should be directed to MAC address "A". Accordingly, communication manager 202(1) derives an updated reply packet by replacing the MAC address "CC1" of the communication channel 110(1) with MAC address "A" (see FIG. 6E). This replacement is done in both the Tgt MAC field and the Dest MAC field. In addition, communication manager 202(1) changes the op code from "10" to "2" to indicate that the reply packet is now a standard ARP reply packet. After the reply packet is updated in this manner, the communication manager 202(1) sends the updated reply packet to host 106(a).

Based on the MAC address CC4 in the Snd MAC field, host 106(a) believes that the MAC address for host 106(x) is "CC4", not "X". Thus, again, the actual MAC address of a host is shielded from both the network 102 and from other hosts. Host 106(a) will thereafter use IP address "x" and MAC address "CC4" to direct packets to host 106(x).

Just as host 106(a) sent a second address request packet to request a MAC address for host 106(x), host 106(e) also sends a second address request packet to again request a MAC address for target host 106(z). This process is carried out in a manner similar to that described above. Specifically, host 106(e) again composes an address request packet. This packet has the header shown in FIG. 7A, which is identical to the header of the previous address request packet shown in FIG. 5A. Host 106(e) again sends this packet to border component 104(1) via communication channel 110(1).

Upon receiving the address request packet via communication channel 110(1), the communication manager 202(1) on border component 104(1) processes the packet and determines that this is the second address request packet being sent by a host having IP address "e" and MAC address "E" asking for a MAC address for a target host having IP address "z" (recall that the communication manager 202(1) had previously stored information in a storage to indicate that a host having IP address "e" and MAC address "E" had sent an address request packet asking for a MAC address for a target host having IP address "z"). From this determination, the communication manager 202(1) concludes that the host 106 (e) did not receive a reply to its first address request packet. As a result, communication manager 202(1) processes this packet differently. Like it did with the previous address request packet, the communication manager 202(1) updates this packet by replacing the MAC address "E" of the sending host 106(e) with the MAC address "CC1" of the communication channel 110(1) (both in the Snd MAC field and the Src MAC field) (see FIG. 7B). However, unlike the previous packet shown in FIG. 5B, the communication manager 202(1) does not change the op code from "1" to "9". Rather, it leaves the op code as "1", thereby indicating that the updated address request packet is still a standard ARP request packet. These and other updates may be made to the address request packet. After the address request packet is updated, it is sent by the communication manager 202(1), via communication channel 110(1), into the network 102, and the packet is thereafter broadcasted throughout the network 102, eventually reaching border component 104(n) via communication channel 110 (4).

Upon receiving the updated address request packet via communication channel 110(4), the communication manager 202(n) on border component 104(n) determines from the op code "1" in the packet that the packet is a standard ARP request packet. Thus, the communication manager 202(n) broadcasts the packet, without modification, to all of the hosts 106(x)-106(z) coupled to the communication channel 110(4) on which the packet was received.

Upon receiving the packet, host 106(z) recognizes from the op code "1" that the packet is a standard ARP request packet, and recognizes from the target IP address "z" that the packet is requesting its (host 106(z)'s) MAC address. Thus, host 106(z) updates the request packet to compose a reply packet (see FIG. 7C). Specifically, host 106(z) takes the IP address "e" in the Snd IP field of the request packet (FIG. 7B) and puts it into the Tgt IP field of the reply packet (FIG. 7C), and takes the MAC address "CC1" in the Snd MAC field of the request packet and puts it into the Tgt MAC field and the Dest MAC field of the reply packet. This serves to direct the reply packet back to the sender of the request packet. In addition to doing this, host 106(z) further derives the reply packet by inserting its IP address "z" into the Snd IP field, inserting its MAC address "Z" into the Snd MAC field, and replacing the MAC address "CC1" currently in the Src MAC field with its own MAC address "Z". By doing so, host 106(z) provides its MAC address (which is being requested by the request packet), and indicates that the sender of the reply packet has IP address "z" and MAC address "Z". Furthermore, host 106(z) changes the op code from "1" to "2" to indicate that the packet is now a standard ARP reply packet. Once that is done, host 106(z) sends the reply packet to border component 104(n) via communication channel 110(4).

In addition to composing and sending the reply packet, the host 106(z) also obtains from the request packet (FIG. 7B) the IP address "e" from the Snd IP field and the MAC address "CC1" from the Snd MAC field. In the future, should the host 106(z) wish to send a packet to host 106(e), it will use IP address "e" and MAC address "CC1" to direct a packet to host 106(e). Notice that as a result of the border components 104(1), 104(n) replacing actual host MAC addresses with the MAC addresses CC1, CC4 of the communication channels, the host 106(z) believes that the MAC address for host 106(e) is "CC1" instead of "E".

The communication manager 202(n) receives, via communication channel 110(4), the reply packet from host 106(z). From op code "2", communication manager 202(n) knows that this is a standard ARP reply packet. Based upon this knowledge, the communication manager 202(n) operates as follows. First, it obtains the IP address "z" from the Snd IP field and the MAC address "Z" from the Snd MAC field. Knowing that these represent the IP address and the MAC address for the host 106(z) that sent the reply packet, the communication manager 202(n) uses these addresses to update MDS 204(n). The result is shown in FIG. 14D. The communication manager 202(n) thus "reverse path learns" the IP and MAC addresses for host 106(z).

In addition to updating MDS 204(n), communication manager 202(n) also updates the reply packet to derive an updated reply packet. As shown in FIG. 7D, the communication manager 202(n) replaces the MAC address "Z" of host 106(z) with the MAC address "CC4" of communication channel 110(4) (this is done in both the Snd MAC field and the Src MAC field). This serves to shield the actual MAC address of host 106(z) from the network 102 and the other hosts, and to make it appear as if the reply packet were being sent by communication channel 110(4). In addition, communication manager 202(n) changes the op code from "2" to "10" to indicate that the updated reply packet is no longer a standard ARP reply packet. These and other updates may be made to the reply packet. After the reply packet is updated, it is sent by the communication manager 202(n) into the network 102 via communication channel 110(4). Since the network 102 has already "reverse path learned" the path back to communication channel 110(1), the updated reply packet will be properly switched to border component 104(1).

Upon receiving the updated reply packet via communication channel 110(1), the communication manager 202(1) on border component 104(1) sees from the op code "10" that the updated reply packet is a FARP reply packet. Accordingly, the communication manager 202(1) processes the packet as follows. First, it determines which host 106(a)-106(e) the packet should be directed to. To make this determination, the communication manager 202(1) obtains from the Tgt IP field of the updated reply packet the IP address "e" of the host that sent the original address request packet to which this packet is a reply. The communication manager 202(1) then accesses MDS 204(1) to see if there is any entry that references this IP address "e". As shown in FIG. 14D, MDS 204(1) contains an entry that maps IP address "e" to MAC address "E". From this, communication manager 202(1) determines that the updated reply packet should be directed to MAC address "E". Accordingly, communication manager 202(1) derives an updated reply packet by replacing the MAC address "CC1" of the communication channel 110(1) with MAC address "E" (see FIG. 7E). This replacement is done in both the Tgt MAC field and the Dest MAC field. In addition, communication manager 202(1) changes the op code from "10" to "2" to indicate that the reply packet is now a standard ARP reply packet. After the reply packet is updated in this manner, the communication manager 202(1) sends the updated reply packet to host 106(e).

Based on the MAC address CC4 in the Snd MAC field, host 106(e) believes that the MAC address for host 106(z) is "CC4", not "Z". Thus, again, the actual MAC address of a host is shielded from both the network 102 and from other hosts. Host 106(e) will thereafter use IP address "z" and MAC address "CC4" to direct packets to host 106(z).

The above discussion shows how a border component (e.g. 104(n)) handles ARP and FARP request packets when that border component does not already have information in its MDS (e.g. MDS 204(n)) pertaining to the target host. To illustrate how a border component may handle FARP request packets when it does have information in its MDS pertaining to the target host, reference will be made to the following examples.

Suppose that host 106(c) knows the IP address of host 106(z) and wishes to ascertain the MAC address of host 106(z). To do so, host 106(c) composes an address request packet having a header such as that shown in FIG. 8A. This header indicates that: (1) the IP address of the sending host 106(c) is "c"; (2) the MAC address of the sending host is "C"; (3) the IP address of the target host is "z"; (4) the MAC address of the target host is unknown and hence is being requested; (5) the packet is a standard ARP request packet (indicated by op code "1"); (6) the source MAC address for the packet is "C"; and (7) the destination MAC address is BCST. After composing the address request packet, host 106 (c) sends it to border component 104(1) via communication channel 110(1).

Upon receiving the address request packet via communication channel 110(1), the communication manager 202(1) on border component 104(1) performs several operations. First, it obtains from the packet the IP address and the MAC address of the host sending the packet, and uses this information to populate MDS 204(1). In the address request packet, the IP address and the MAC address of the sending host 106(c) are "c" and "C", respectively. Thus, this information is used by the communication manager 202(1) to populate MDS 204(1). The result is shown in FIG. 14E. In this manner, the communication manager 202(1) "reverse path learns" the IP address and MAC address of host 106(c).

In addition to updating MDS 204(1), communication manager 202(1) also determines the type of the packet. From op code "1", the communication manager 202(1) knows that this is a standard ARP request packet. In response to this determination, the communication manager 202(1), in one embodiment, stores some information in the previously mentioned storage (not shown) to indicate that a host having IP address "c" and MAC address "C" has sent an address request packet asking for a MAC address for a target host having IP address "z".

Furthermore, communication manager 202(1) updates the address request packet to derive an updated packet. The header of the updated packet is shown in FIG. 8B. Specifically, the communication manager 202(1) replaces the MAC address "C" of the sending host 106(c) with the MAC address "CC 1" of the communication channel 110(1) (both in the Snd MAC field and the Src MAC field). By doing so, the communication manager 202(1) shields the MAC address "C" of host 106(c) from the network 102 and makes it appear as if the packet were being sent by communication channel 110(1). In addition, communication manager 202(1) changes the op code from "1" to "9" to indicate that the updated request packet is a FARP request packet. These and other updates may be made to the address request packet. After the address request packet is updated, it is sent by the communication manager 202(1), via communication channel 110(1), into the network 102. The packet will thereafter be broadcasted throughout the network 102, and will eventually reach communication channel 10(n) of border component 104(n).

Upon receiving the updated address request packet, the communication manager 202(n) on border component 104(n) determines the type of the packet. From the op code "9", communication manager 202(n) determines that the packet is a FARP request packet, not a standard ARP request packet. Upon seeing that the packet is a non-standard address request packet, communication manager 202(n) determines whether the target host having IP address "z" for which a MAC address is being sought is one of the hosts coupled to communication channel 110(4). In one embodiment, communication manager 202(n) makes this determination by checking MDS 204(n) to see if IP address "z" is referenced in any of the entries in MDS 204(n). In the current example, MDS 204(n) does contain an entry that references IP address "z" (see FIG. 14E). As a result, communication manager 202(n) concludes that the target host having IP address "z" is one of the hosts coupled to communication channel 110(4). In response to this determination, the communication manager 202(n), in one embodiment, does not forward the address request packet to host 106(z). Rather, the communication manager 202(n) independently composes a reply packet.

In one embodiment, the communication manager 202(n) derives the reply packet by updating the request packet. The header of the resulting reply packet is shown in FIG. 8C. Specifically, communication manager 202(n) takes the IP address "c" in the Snd IP field of the request packet (FIG. 8B) and puts it into the Tgt IP field of the reply packet (FIG. 8C), and takes the MAC address "CC1" in the Snd MAC field of the request packet and puts it into the Tgt MAC field and the Dest MAC field of the reply packet. This serves to direct the reply packet back to the sender of the request packet. In addition to doing this, communication manager 202(n) further derives the reply packet by inserting the IP address "z" of the target host into the Snd IP field, and inserting the MAC address "CC4" of the communication channel 110(4) into the Snd MAC field. By doing so, communication manager 202(n) makes it appear as if the MAC address of host 106(z) (which is being requested by the request packet) were "CC4". In this manner, the actual MAC address "Z" of host 106(z) is shielded from the network and the requesting host 106(c). The communication manager 202(n) also replaces the MAC address "CC1" currently in the Src MAC field with MAC address "CC4" to make it appear as if the communication channel 110(4) were sending the reply packet. Finally, communication manager 202(n) changes the op code from "9" to "10" to indicate that the updated packet is now a FARP reply packet. These and other updates may be made to the request packet. After it derives the reply packet, the communication manager 202(n) sends the reply packet into the network 102 via communication channel 110(4). Since the network 102 has already "reverse path learned" the path back to communication channel 110(1), the reply packet will be properly switched to border component 104(1).

Upon receiving the reply packet via communication channel 110(1), the communication manager 202(1) on border component 104(1) sees from the op code "10" that the reply packet is a FARP reply packet. Accordingly, the communication manager 202(1) processes the packet as follows. First, it determines which host 106(a)-106(e) the packet should be directed to. To make this determination, the communication manager 202(1) obtains from the Tgt IP field of the reply packet the IP address "c" of the host that sent the original address request packet to which this packet is a reply. The communication manager 202(1) then accesses MDS 204(1) to see if there is any entry that references this IP address "c". As shown in FIG. 14E, MDS 204(1) contains an entry that maps IP address "c" to MAC address "C". From this, communication manager 202(1) determines that the reply packet should be directed to MAC address "C". Accordingly, communication manager 202(1) updates the reply packet by replacing the MAC address "CC1" of the communication channel 110(1) with MAC address "C" (see FIG. 8D). This replacement is done in both the Tgt MAC field and the Dest MAC field. In addition, communication manager 202(1) changes the op code from "10" to "2" to indicate that the reply packet is now a standard ARP reply packet. After the reply packet is updated in this manner, the communication manager 202(1) sends the updated reply packet to host 106(c).

Based on the MAC address CC4 in the Snd MAC field, host 106(c) believes that the MAC address for host 106(z) is "CC4", not "Z". Thus, again, the actual MAC address of a host is shielded from both the network 102 and from other hosts. Host 106(c) will thereafter use IP address "z" and MAC address "CC4" to direct packets to host 106(z).

Having the border component 104(n) independently prepare a reply packet as described above is advantageous in that it eliminates the need to forward the request packet to the host 106(z) and to have the host 106(z) prepare a reply packet. A disadvantage is that, because the host 106(z) does not receive the request packet, it will not learn the IP and MAC addresses for host 106(c). As a result, should host 106(z) ever wish to communicate with host 106(c), host 106(z) will have to send an ARP request packet to learn the MAC address of host 106(c).

As an alternative to having the border component 104(n) independently prepare a reply packet to the address request packet, a "pass through" approach may be used in which the request packet is passed through to the target host. This approach is described below.

Suppose again that host 106(c) knows the IP address of host 106(z) and wishes to ascertain the MAC address of host 106(z). To do so, host 106(c) composes an address request packet having a header such as that shown in FIG. 9A. This header is identical to the header shown in FIG. 8A, which was previously discussed. After composing the address request packet, host 106(c) sends it to border component 104(1) via communication channel 110(1).

Upon receiving the address request packet via communication channel 110(1), the communication manager 202(1) on border component 104(1) performs the same operations and makes the same updates to the request packet as those previously discussed in connection with FIG. 8B. The header of the resulting updated request packet is shown in FIG. 9B, which is identical to the header shown in FIG. 8B. After the address request packet is updated, it is sent by the communication manager 202(1), via communication channel 110(1), into the network 102. The packet will thereafter be broadcasted throughout the network 102, and will eventually reach communication channel 110(n) of border component 104(n).

Upon receiving the updated address request packet, the communication manager 202(n) on border component 104(n) determines the type of the packet. From the op code "9", communication manager 202(n) determines that the packet is a FARP request packet, not a standard ARP request packet. Upon seeing that the packet is a non-standard address request packet, communication manager 202(n) determines whether the target host having IP address "z" for which a MAC address is being sought is one of the hosts coupled to communication channel 110(4). In one embodiment, communication manager 202(n) makes this determination by accessing MDS 204(n) and determining whether the IP address "z" is referenced in any of the entries in MDS 204(n). In the current example, MDS 204(n) does contain an entry that references IP address "z" (see FIG. 14E). As a result, communication manager 202(n) concludes that the target host having IP address "z" is one of the hosts coupled to communication channel 110(4). In addition, from this same entry, the communication manager 202(n) sees that MAC address "Z" is associated with IP address "z"; thus, communication manager 202(n) knows that the MAC address for the target host 106(z) is "Z".

In response to this determination, the communication manager 202(n), in one embodiment, updates the address request packet to derive an updated request packet. As shown in FIG. 9C, communication manager 202(n) changes the op code from "9" to "1" to indicate that the updated packet is again a standard ARP request packet. In addition, communication manager 202(n) changes the value in the Dest MAC field from BCST to "Z", the MAC address of the target host 106(z). After updating the request packet, communication manager 202(n) sends the updated request packet to target host 106(z) via communication channel 110(4). As an alternative, communication manager 202(n) may leave the Dest MAC field as BCST and send the updated request packet to target host 106(z) by broadcasting it to all of the hosts 106(x)-106(z).

Upon receiving the request packet, host 106(z) recognizes from the op code "1" that the packet is a standard ARP request packet, and recognizes from the target IP address "z" that the packet is requesting its (host 106(z)'s) MAC address. Thus, host 106(z) updates the request packet to compose a reply packet (see FIG. 9D). Specifically, host 106(z) takes the IP address "c" in the Snd IP field of the request packet (FIG. 9C) and puts it into the Tgt IP field of the reply packet (FIG. 9D), and takes the MAC address "CC1" in the Snd MAC field of the request packet and puts it into the Tgt MAC field and the Dest MAC field of the reply packet. This serves to direct the reply packet back to the sender of the request packet. In addition to doing this, host 106(z) further derives the reply packet by inserting its IP address "z" into the Snd IP field, inserting its MAC address "Z" into the Snd MAC field, and replacing the MAC address "CC1" currently in the Src MAC field with its own MAC address "Z". By doing so, host 106(z) provides its MAC address (which is being requested by the request packet), and indicates that the sender of the reply packet has IP address "z" and MAC address "Z". Furthermore, host 106(z) changes the op code from "1" to "2" to indicate that the packet is now a standard ARP reply packet. Once that is done, host 106(z) sends the reply packet to border component 104(n) via communication channel 110(4).

In addition to composing and sending the reply packet, the host 106(z) also obtains from the request packet (FIG. 9C) the IP address "c" from the Snd IP field and the MAC address "CC1" from the Snd MAC field. In the future, should the host 106(z) wish to send a packet to host 106(c), it will use IP address "c" and MAC address "CC1" to direct a packet to host 106(c). Notice that as a result of the border components 104(1), 104(n) replacing actual host MAC addresses with the MAC addresses CC1, CC4 of the communication channels, the host 106(z) believes that the MAC address for host 106(c) is "CC1" instead of "C".

The communication manager 202(n) receives, via communication channel 110(4), the reply packet from host 106(z). From op code "2", communication manager 202(n) knows that this is a standard ARP reply packet. Based upon this knowledge, the communication manager 202(n) operates as follows. First, it obtains the IP address "z" from the Snd IP field and the MAC address "Z" from the Snd MAC field. Knowing that these represent the IP address and the MAC address for the host 106(z) that sent the reply packet, the communication manager 202(n) uses these addresses to update MDS 204(n), if necessary. In the current example, these addresses are already in MDS 204(n); thus, there is no need for communication manager 202(n) to add them again to MDS 204(n).

In addition to potentially updating MDS 204(n), communication manager 202(n) also updates the reply packet to derive an updated reply packet. As shown in FIG. 9E, the communication manager 202(n) replaces the MAC address "Z" of host 106(z) with the MAC address "CC4" of communication channel 110(4) (this is done in both the Snd MAC field and the Src MAC field). This serves to shield the actual MAC address of host 106(z) from the network 102 and the other hosts, and to make it appear as if the reply packet were being sent by communication channel 110(4). In addition, communication manager 202(n) changes the op code from "2" to "10" to indicate that the updated reply packet is no longer a standard ARP reply packet but rather is a FARP reply packet. These and other updates may be made to the reply packet. After the reply packet is updated, it is sent by the communication manager 202(n) into the network 102 via communication channel 110(4). Since the network 102 has already "reverse path learned" the path back to communication channel 110(1), the updated reply packet will be properly switched to border component 104(1).

Upon receiving the updated reply packet via communication channel 110(1), the communication manager 202(1) on border component 104(1) sees from the op code "10" that the updated reply packet is a FARP reply packet. Accordingly, the communication manager 202(1) processes the packet as follows. First, it determines which host 106(a)-106(e) the packet should be directed to. To make this determination, the communication manager 202(1) obtains from the Tgt IP field of the updated reply packet the IP address "c" of the host that sent the original address request packet to which this packet is a reply. The communication manager 202(1) then accesses MDS 204(1) to see if there is any entry that references this IP address "c". As shown in FIG. 14D, MDS 204(1) contains an entry that maps IP address "c" to MAC address "C". From this, communication manager 202(1) determines that the updated reply packet should be directed to MAC address "C". Accordingly, communication manager 202(1) updates the reply packet by replacing the MAC address "CC1" of the communication channel 110(1) with MAC address "C" (see FIG. 9F). This replacement is done in both the Tgt MAC field and the Dest MAC field. In addition, communication manager 202(1) changes the op code from "10" to "2" to indicate that the reply packet is now a standard ARP reply packet. After the reply packet is updated in this manner, the communication manager 202(1) sends the updated reply packet to host 106(c).

Based on the MAC address CC4 in the Snd MAC field, host 106(c) believes that the MAC address for host 106(z) is "CC4", not "Z". Thus, again, the actual MAC address of a host is shielded from both the network 102 and from other hosts. Host 106(c) will thereafter use IP address "z" and MAC address "CC4" to direct packets to host 106(z).

In the manner described above, the hosts 106(a)-106(z), the MDSs 204(1) and 204(2), and the switches in the network 102 can be automatically initialized.

Handling of Data Packets

After the hosts and MDSs are initialized with the necessary information, the system 100 is ready to handle data packets. To illustrate how data packets may be handled in accordance with one embodiment of the present invention, reference will be made to the following examples.

Suppose that host 106(*a*) wishes to send a data packet to destination host 106(*x*). To do so, host 106(*a*) prepares a data packet having a packet header such as that shown in FIG. 10A. This header includes the IP address "a" of sending host 106(*a*) in the Snd IP field, includes the MAC address "A" of sending host 106(*a*) in the Src MAC field, includes the IP address "x" of the destination host 106(*x*) in the Dest IP field, and includes the MAC address "CC4" of the destination host 106(*x*) in the Dest MAC field (recall that host 106(*a*) believes the destination MAC address of host 106(*x*) to be "CC4"). After composing the data packet, host 106(*a*) sends the data packet to border component 104(1) via communication channel 110(1).

Upon receiving the data packet via communication channel 110(1), the communication manager 202(1) on border component 104(1) performs several operations. First, it obtains from the packet the IP address and the MAC address of the host sending the packet, and uses this information to populate MDS 204(1), if necessary. In the current example, this information is already in MDS 204(1); thus, communication manager 202(1) does not need to add the information again to the MDS 204(1).

In addition to potentially updating MDS 204(1), communication manager 202(1) also determines the type of the packet. In the current example, the packet is a data packet. In response to the packet being a data packet, the communication manager 202(1) updates the data packet to derive an updated data packet. The header of the updated data packet is shown in FIG. 10B. Specifically, the communication manager 202(1) replaces the MAC address "A" in the Src MAC field with the MAC address "CC1" of the communication channel 110(1). Doing so shields the MAC address "A" of host 106(*a*) from the network 102. In addition to this update, the communication manager 202(1) may further update the packet with additional information, such as adding VLAN information as taught in U.S. application Ser. Nos. 11/056,436, 11/336,713, 11/732,601, and 11/732,599. These and other updates may be made to the data packet. After the data packet is updated, it is sent by the communication manager 202(1), via communication channel 110(1), into the network 102. Based upon the destination MAC address CC4, the packet is switched by the network 102 to communication channel 110(4) of border component 104(*n*).

Upon receiving the updated data packet, the communication manager 202(*n*) on border component 104(*n*) determines the type of the packet. Upon seeing that the packet is a data packet, communication manager 202(*n*) proceeds to determine which destination MAC address the packet should be sent to. In one embodiment, communication manager 202(*n*) makes this determination by obtaining from the data packet the IP address "x" specified in the Dest IP field. The communication manager 202(*n*) then accesses the MDS 204(*n*) and looks for an entry that references the destination IP address "x". In the current example, MDS 204(*n*) contains such an entry (see FIG. 14E). This entry indicates that the IP address "x" is associated with MAC address "X". From this information, the communication manager 202(*n*) concludes that the data packet should be directed to MAC address "X". Accordingly, communication manager 202(*n*) updates the header of the data packet as shown in FIG. 10C to replace the MAC address "CC4" in the Dest MAC field with the MAC address "X". This causes the data packet to be directed to host 106(*x*). After deriving the updated data packet, communication manager 202(*n*) sends the updated data packet to host 106(*x*) via communication channel 10(*n*). In this manner, the data packet is properly delivered to host 106(*x*) despite the fact that the original data packet never specified the actual MAC address for host 106(*x*).

A data packet sent by host 106(*e*) destined for host 106(*z*) may be delivered in a similar fashion. Specifically, host 106 (*e*) may prepare a data packet having a packet header such as that shown in FIG. 11A. This header includes the IP address "e" of sending host 106(*e*) in the Snd IP field, includes the MAC address "E" of sending host 106(*e*) in the Src MAC field, includes the IP address "z" of the destination host 106(*z*) in the Dest IP field, and includes the MAC address "CC4" of the destination host 106(*z*) in the Dest MAC field (recall that host 106(*e*) believes the destination MAC address of host 106(*z*) to be "CC4"). After composing the data packet, host 106(*e*) sends the data packet to border component 104(1) via communication channel 110(1).

Upon receiving the data packet via communication channel 110(1), the communication manager 202(1) on border component 104(1) performs several operations. First, it obtains from the packet the IP address and the MAC address of the host sending the packet, and uses this information to populate MDS 204(1), if necessary. In the current example, this information is already in MDS 204(1); thus, communication manager 202(1) does not need to add the information again to the MDS 204(1).

In addition to potentially updating MDS 204(1), communication manager 202(1) also determines the type of the packet. In the current example, the packet is a data packet. In response to the packet being a data packet, the communication manager 202(1) updates the data packet to derive an updated data packet. The header of the updated data packet is shown in FIG. 11B. Specifically, the communication manager 202(1) replaces the MAC address "E" in the Src MAC field with the MAC address "CC 1" of the communication channel 110(1). Doing so shields the MAC address "E" of host 106(*e*) from the network 102. This and other updates may be made to the data packet. After the data packet is updated, it is sent by the communication manager 202(1), via communication channel 110(1), into the network 102. Based upon the destination MAC address CC4, the packet is switched by the network 102 to communication channel 110(4) of border component 104(*n*).

Upon receiving the updated data packet, the communication manager 202(*n*) on border component 104(*n*) determines the type of the packet. Upon seeing that the packet is a data packet, communication manager 202(*n*) proceeds to determine which destination MAC address the packet should be sent to. In one embodiment, communication manager 202(*n*) makes this determination by obtaining from the data packet the IP address "z" specified in the Dest IP field. The communication manager 202(*n*) then accesses the MDS 204(*n*) and looks for an entry that references the destination IP address "z". In the current example, MDS 204(*n*) contains such an entry (see FIG. 14E). This entry indicates that the IP address "z" is associated with MAC address "Z". From this information, the communication manager 202(*n*) concludes that the data packet should be directed to MAC address "Z". Accordingly, communication manager 202(*n*) updates the header of the data packet as shown in FIG. 11C to replace the MAC address "CC4" in the Dest MAC field with the MAC address "Z". This causes the data packet to be directed to host 106(*z*). After deriving the updated data packet, communication manager 202(*n*) sends the updated data packet to host 106(*z*) via communication channel 10(n). In this manner, the data packet is properly delivered to host 106(z) despite the fact that the original data packet never specified the actual MAC address for host 106(z).

Suppose now that host 106(x) wishes to send its own data packet to host 106(a). To do so, host 106(x) prepares a data packet having a packet header such as that shown in FIG. 12A. This header includes the IP address "x" of sending host 106(x) in the Snd IP field, includes the MAC address "X" of sending host 106(x) in the Src MAC field, includes the IP address "a" of the destination host 106(a) in the Dest IP field, and includes the MAC address "CC1" of the destination host 106(a) in the Dest MAC field (recall that host 106(x) believes the destination MAC address of host 106(a) to be "CC1"). After composing the data packet, host 106(x) sends the data packet to border component 104(n) via communication channel 110(4).

Upon receiving the data packet via communication channel 110(4), the communication manager 202(n) on border component 104(n) performs several operations. First, it obtains from the packet the IP address and the MAC address of the host sending the packet, and uses this information to populate MDS 204(n), if necessary. In the current example, this information is already in MDS 204(n); thus, communication manager 202(n) does not need to add the information again to the MDS 204(n).

In addition to potentially updating MDS 204(n), communication manager 202(n) also determines the type of the packet. In the current example, the packet is a data packet. In response to the packet being a data packet, the communication manager 202(n) updates the data packet to derive an updated data packet. The header of the updated data packet is shown in FIG. 12B. Specifically, the communication manager 202(n) replaces the MAC address "X" in the Src MAC field with the MAC address "CC4" of the communication channel 110(4). Doing so shields the MAC address "X" of host 106(x) from the network 102. This and other updates may be made to the data packet. After the data packet is updated, it is sent by the communication manager 202(n), via communication channel 110(4), into the network 102. Based upon the destination MAC address CC1, the packet is switched by the network 102 to communication channel 110(1) of border component 104(1).

Upon receiving the updated data packet, the communication manager 202(1) on border component 104(1) determines the type of the packet. Upon seeing that the packet is a data packet, communication manager 202(1) proceeds to determine which destination MAC address the packet should be sent to. In one embodiment, communication manager 202(1) makes this determination by obtaining from the data packet the IP address "a" specified in the Dest IP field. The communication manager 202(1) then accesses the MDS 204(1) and looks for an entry that references the destination IP address "a". In the current example, MDS 204(1) contains such an entry (see FIG. 14E). This entry indicates that the IP address "a" is associated with MAC address "A". From this information, the communication manager 202(1) concludes that the data packet should be directed to MAC address "A". Accordingly, communication manager 202(1) updates the header of the data packet as shown in FIG. 12C to replace the MAC address "CC1" in the Dest MAC field with the MAC address "A". This causes the data packet to be directed to host 106(a). After deriving the updated data packet, communication manager 202(1) sends the updated data packet to host 106(a) via communication channel 110(1). In this manner, the data packet is properly delivered to host 106(a) despite the fact that the original data packet never specified the actual MAC address for host 106(a).

Further suppose that host 106(z) wishes to send its own data packet to host 106(e). To do so, host 106(z) prepares a data packet having a packet header such as that shown in FIG. 13A. This header includes the IP address "z" of sending host 106(z) in the Snd IP field, includes the MAC address "Z" of sending host 106(z) in the Src MAC field, includes the IP address "e" of the destination host 106(e) in the Dest IP field, and includes the MAC address "CC1" of the destination host 106(e) in the Dest MAC field (recall that host 106(z) believes the destination MAC address of host 106(e) to be "CC1"). After composing the data packet, host 106(z) sends the data packet to border component 104(n) via communication channel 110(4).

Upon receiving the data packet via communication channel 110(4), the communication manager 202(n) on border component 104(n) performs several operations. First, it obtains from the packet the IP address and the MAC address of the host sending the packet, and uses this information to populate MDS 204(n), if necessary. In the current example, this information is already in MDS 204(n); thus, communication manager 202(n) does not need to add the information again to the MDS 204(n).

In addition to potentially updating MDS 204(n), communication manager 202(n) also determines the type of the packet. In the current example, the packet is a data packet. In response to the packet being a data packet, the communication manager 202(n) updates the data packet to derive an updated data packet. The header of the updated data packet is shown in FIG. 13B. Specifically, the communication manager 202(n) replaces the MAC address "Z" in the Src MAC field with the MAC address "CC4" of the communication channel 110(4). Doing so shields the MAC address "Z" of host 106(z) from the network 102. This and other updates may be made to the data packet. After the data packet is updated, it is sent by the communication manager 202(n), via communication channel 110(4), into the network 102. Based upon the destination MAC address CC1, the packet is switched by the network 102 to communication channel 110(1) of border component 104(1).

Upon receiving the updated data packet, the communication manager 202(1) on border component 104(1) determines the type of the packet. Upon seeing that the packet is a data packet, communication manager 202(1) proceeds to determine which destination MAC address the packet should be sent to. In one embodiment, communication manager 202(1) makes this determination by obtaining from the data packet the IP address "e" specified in the Dest IP field. The communication manager 202(1) then accesses the MDS 204(1) and looks for an entry that references the destination IP address "e". In the current example, MDS 204(1) contains such an entry (see FIG. 14E). This entry indicates that the IP address "e" is associated with MAC address "E". From this information, the communication manager 202(1) concludes that the data packet should be directed to MAC address "E". Accordingly, communication manager 202(1) updates the header of the data packet as shown in FIG. 13C to replace the MAC address "CC 1" in the Dest MAC field with the MAC address "E". This causes the data packet to be directed to host 106(e). After deriving the updated data packet, communication manager 202(1) sends the updated data packet to host 106(e) via communication channel 110(1). In this manner, the data packet is properly delivered to host 106(e) despite the fact that the original data packet never specified the actual MAC address for host 106(e).

In the manner described, the actual MAC addresses of the hosts 106(*a*)-106(*z*) are effectively shielded from the network 102 and from the other hosts. Because these MAC addresses are shielded from the network 102, the switches in the network will not need to store these MAC addresses in their forwarding tables. Instead, the switches will need to store only the MAC addresses of the communication channels 110 in their forwarding tables. What this means is that any number of hosts may be accommodated by the network 102. So long as the forwarding tables of the switches can accommodate all of the MAC addresses of the communication channels, the system will function properly. As a result, the scalability of the system in terms of the number of hosts that it can accommodate is greatly improved.

At this point, it should be noted that although the invention has been described with reference to one or more specific embodiments, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A method performed by a border component interposed between a network of switches and a plurality of local hosts, the method comprising:
   receiving, by the border component from a first local host of the plurality of local hosts, a first packet destined for a first destination host, wherein the first local host has a first layer 2 (L2) address and a first layer 3 (L3) address associated therewith, and wherein the first packet includes the first L2 address as a source L2 address for the first packet, and includes the first L3 address as a source L3 address for the first packet;
   shielding, by the border component, the first L2 address from the network of switches by replacing the source L2 address for the first packet with a substitute L2 address associated with a communication channel of the border component;
   sending, by the border component, the first packet to the network of switches;
   receiving, by the border component from a second local host of the plurality of hosts, a second packet destined for a second destination host, wherein the second local host has a second L2 address and a second L3 address associated therewith, and wherein the second packet includes the second L2 address as a source L2 address for the second packet, and includes the second L3 address as a source L3 address for the second packet;
   shielding, by the border component, the second L2 address from the network of switches by replacing the source L2 address for the second packet with the substitute L2 address; and
   sending, by the border component, the second updated packet to the network of switches.

2. The method of claim 1, wherein the first L2 address and the substitute L2 address comprise media access control (MAC) addresses, and wherein the first L3 address comprises an Internet Protocol (IP) address.

3. The method of claim 1, further comprising:
   receiving, from the network of switches, a third packet, wherein the third packet includes the first L3 address as a destination L3 address, and includes the substitute L2 address as a destination L2 address;
   accessing a data structure, wherein the data structure comprises a first set of information that indicates an association between the first L3 address and the first L2 address;
   determining, based at least partially upon the first L3 address in the third packet and the first set of information, that the destination L2 address for the third packet should be the first L2 address;
   deriving a third updated packet from the third packet, wherein deriving the third updated packet comprises replacing the substitute L2 address with the first L2 address, thereby making the first L2 address the destination L2 address for the third updated packet; and
   sending the third updated packet to the first local host.

4. The method of claim 3, further comprising:
   receiving, from the network of switches, a fourth packet, wherein the fourth packet includes the second L3 address as a destination L3 address, and includes the substitute L2 address as a destination L2 address;
   accessing the data structure, wherein the data structure comprises a second set of information that indicates an association between the second L3 address and the second L2 address;
   determining, based at least partially upon the second L3 address in the fourth packet and the second set of information, that the destination L2 address for the fourth packet should be the second L2 address;
   deriving a fourth updated packet from the fourth packet, wherein deriving the fourth updated packet comprises replacing the substitute L2 address with the second L2 address, thereby making the second L2 address the destination L2 address for the fourth updated packet; and
   sending the fourth updated packet to the second local host.

5. A border component configured to be interposed between a plurality of local hosts and a network of switches, comprising:
   a communication channel; and
   a communication manager configured to:
      receive, from a first local host of the plurality of local hosts coupled to the communication channel, a first packet destined for a first destination host, wherein the first local host has a first layer 2 (L2) address and a first layer 3 (L3) address associated therewith, and wherein the first packet includes the first L2 address as a source L2 address for the first packet, and includes the first L3 address as a source L3 address for the first packet;
      shield the first L2 address from the network of switches by replacing the source L2 address for the first packet with a substitute L2 address associated with the communication channel;
      send, via the communication channel, the first packet to the network of switches;
      receive, from a second local host of the plurality of local hosts coupled to the communication channel, a second packet destined for a second destination host, wherein the second host has a second L2 address and a second L3 address associated therewith, and wherein the second packet includes the second L2 address as a source L2 address for the second packet, and includes the second L3 address as a source L3 address for the second packet;
      shield the second L2 address from the network of switches by replacing the source L2 address for the second packet with the substitute L2 address; and
      send, via the communication channel, the second packet to the network of switches.

6. The border component of claim 5, wherein the first L2 address and the substitute L2 address comprise media access control (MAC) addresses, and wherein the first L3 address comprises an Internet Protocol (IP) address.

7. The border component of claim 1, wherein the communication manager is further configured to:
receive, from the network of switches via the communication channel, a third packet, wherein the third packet includes the first L3 address as a destination L3 address, and includes the substitute L2 address as a destination L2 address;
access a data structure, wherein the data structure comprises a first set of information that indicates an association between the first L3 address and the first L2 address;
determine, based at least partially upon the first L3 address in the third packet and the first set of information, that the destination L2 address for the third packet should be the first L2 address;
derive a third updated packet from the third packet, wherein deriving the third updated packet comprises replacing the substitute L2 address with the first L2 address, thereby making the first L2 address the destination L2 address for the third updated packet; and
send, via the communication channel, the third updated packet to the first local host.

8. The border component of claim 7, wherein the communication manager is further configured to:
receive, from the network of switches via the communication channel, a fourth packet, wherein the fourth packet includes the second L3 address as a destination L3 address, and includes the substitute L2 address as a destination L2 address;
access the data structure, wherein the data structure comprises a second set of information that indicates an association between the second L3 address and the second L2 address;
determine, based at least partially upon the second L3 address in the fourth packet and the second set of information, that the destination L2 address for the fourth packet should be the second L2 address;
derive a fourth updated packet from the fourth packet, wherein deriving the fourth updated packet comprises replacing the substitute L2 address with the second L2 address, thereby making the second L2 address the destination L2 address for the fourth updated packet; and
send, via the communication channel, the fourth updated packet to the second local host.

9. A method performed by a border component interposed between a network of switches and a plurality of local hosts, the method comprising:
receiving, by the border component from a first local host of the plurality of local hosts, a first request packet requesting a layer 2 (L2) address for a first target host, wherein the first local host has a first L2 address and a first layer 3 (L3) address associated therewith, wherein the first target host has a first target L3 address associated therewith, and wherein the first request packet includes the first L2 address as a source L2 address, includes the first L3 address as a sending L3 address, includes the first target L3 address as a target L3 address, and includes an indication that the first request packet is to be broadcasted;
obtaining, by the border component, the first L2 address and the first L3 address associated with the first local host from the first request packet;
updating, by the border component, a data structure to include a first set of information indicating an association between the first L3 address and the first L2 address;
shielding, by the border component, the first L2 address from the network of switches by replacing the source L2 address of the first request packet with a substitute L2 address associated with a communication channel of the border component;
sending, by the border component, the first request packet to the network of switches to be broadcasted throughout the network of switches;
receiving, from a second local host of the plurality of local hosts, a second request packet requesting a L2 address for a second target host, wherein the second host has a second L2 address and a second L3 address associated therewith, wherein the second target host has a second target L3 address associated therewith, and wherein the second request packet includes the second L2 address as a source L2 address, includes the second L3 address as a sending L3 address, includes the second target L3 address as a target L3 address, and includes an indication that the second request packet is to be broadcasted;
obtaining the second L2 address and the second L3 address associated with the second host from the second request packet;
updating the data structure to include a second set of information indicating an association between the second L3 address and the second L2 address;
shielding, by the border component, the second L2 address from the network of switches by replacing the source L2 address of the second request packet with the substitute L2 address associated with the communication channel of the border component; and
sending the second request packet to the network of switches to be broadcasted throughout the network of switches.

10. The method of claim 9, wherein the first L2 address and the substitute L2 address comprise media access control (MAC) addresses, and wherein the first L3 address and the first target L3 address comprise Internet Protocol (IP) addresses.

11. The method of claim 9, further comprising:
receiving, from the network of switches, a first reply packet which is a reply to the first updated request packet, wherein the first reply packet includes the first L3 address, includes the substitute L2 address as a destination L2 address, includes the first target L3 address, and includes a first requested L2 address for the first target host;
accessing the data structure;
determining, based at least partially upon the first L3 address in the first reply packet and the first set of information in the data structure, that the destination L2 address for the first reply packet should be the first L2 address;
deriving a first updated reply packet from the first reply packet, wherein deriving the first updated reply packet comprises replacing the substitute L2 address with the first L2 address, thereby making the first L2 address the destination L2 address for the first updated reply packet; and
sending the first updated reply packet to the first local host.

12. The method of claim 11, wherein the first requested L2 address included in the first reply packet for the first target host is not the target host's real L2 address but rather is an L2 address associated with a communication channel of another border component to which the first target host is coupled.

13. The method of claim 11, further comprising:
receiving, from the network of switches, a second reply packet which is a reply to the second updated request packet, wherein the second reply packet includes the second L3 address, includes the substitute L2 address as a destination L2 address, includes the second target L3 address, and includes a second requested L2 address for the second target host;
accessing the data structure;
determining, based at least partially upon the second L3 address in the second reply packet and the second set of information in the data structure, that the destination L2 address for the second reply packet should be the second L2 address;
deriving a second updated reply packet from the second reply packet, wherein deriving the second updated reply packet comprises replacing the substitute L2 address with the second L2 address, thereby making the second L2 address the destination L2 address for the second updated reply packet; and
sending the second updated reply packet to the second local host.

14. The method of claim 9, wherein the first request packet includes an indication that the first request packet is a standard address request packet, and wherein deriving the first updated request packet further comprises:
including in the first request packet an indication that the first request packet is a non-standard address request packet.

15. The method of claim 14, further comprising:
receiving, from the first local host, a second request packet requesting a L2 address for the first target host, wherein the second request packet includes the first L2 address as a source L2 address, includes the first L3 address as a sending L3 address, includes the first target L3 address as a target L3 address, includes an indication that the second request packet is a standard address request packet, and includes an indication that the second request packet is to be broadcasted;
determining that the second request packet is a second request from the first local host for a L2 address for the first target host, thereby determining that the first local host has not received a reply to the first request packet;
in response to a determination that the first local host has not received a reply to the first request packet, shielding the first L2 address from the network of switches by replacing the source L2 address of the second request packet with the substitute L2 address associated with the communication channel of the border component and maintaining an indication in the second request packet that the second packet is standard address request packet; and
sending the second request packet to the network of switches to be broadcasted throughout the network of switches.

16. The method of claim 11, wherein the first request packet includes an indication that the first request packet is a standard address request packet, and wherein the method further comprises including in the first request packet an indication that the first request packet is a non-standard address request packet.

17. The method of claim 16, wherein the first reply packet includes an indication that the first reply packet is a non-standard address reply packet, and wherein the method further comprises including in the first reply packet an indication that the first reply packet is a standard address reply packet.

18. A border component configured to be interposed between a plurality of local hosts and a network of switches, comprising:
a communication channel; and
a communication manager configured to:
receive, from a first local host of the plurality of local hosts coupled to the communication channel, a first request packet requesting a layer 2 (L2) address for a first target host, wherein the first local host has a first L2 address and a first layer 3 (L3) address associated therewith, wherein the first target host has a first target L3 address associated therewith, and wherein the first request packet includes the first L2 address as a source L2 address, includes the first L3 address as a sending L3 address, includes the first target L3 address as a target L3 address, and includes an indication that the first request packet is to be broadcasted;
obtain the first L2 address and the first L3 address associated with the first host from the first request packet;
update a data structure to include a first set of information indicating an association between the first L3 address and the first L2 address;
shield the first L2 address from the network of switches by replacing the source L2 address of the first request packet with a substitute L2 address associated with a communication channel of the border component;
send, via the communication channel, the first request packet to the network of switches to be broadcasted throughout the network of switches;
receive, from a second local host of the plurality of local hosts coupled to the communication channel, a second request packet requesting a L2 address for a second target host, wherein the second host has a second L2 address and a second L3 address associated therewith, wherein the second target host has a second target L3 address associated therewith, and wherein the second request packet includes the second L2 address as a source L2 address, includes the second L3 address as a sending L3 address, includes the second target L3 address as a target L3 address, and includes an indication that the second request packet is to be broadcasted;
obtain the second L2 address and the second L3 address associated with the second host from the second request packet;
update the data structure to include a second set of information indicating an association between the second L3 address and the second L2 address;
shield the second L2 address from the network of switches by replacing the source L2 address of the second request packet with the substitute L2 address associated with the communication channel of the border component; and
send, via the communication channel, the second request packet to the network of switches to be broadcasted throughout the network of switches.

19. The border component of claim 18, wherein the first L2 address and the substitute L2 address comprise media access control (MAC) addresses, and wherein the first L3 address and the first target L3 address comprise Internet Protocol (IP) addresses.

20. The border component of claim 18, wherein the communication manger is further configured to:
receive, from the network of switches via the communication channel, a first reply packet which is a reply to the first request packet, wherein the first reply packet includes the first L3 address, includes the substitute L2 address as a destination L2 address, includes the first target L3 address, and includes a first requested L2 address for the first target host;

access the data structure;

determine, based at least partially upon the first L3 address in the first reply packet and the first set of information in the data structure, that the destination L2 address for the first reply packet should be the first L2 address;

derive a first updated reply packet from the first reply packet, wherein deriving the first updated reply packet comprises replacing the substitute L2 address with the first L2 address, thereby making the first L2 address the destination L2 address for the first updated reply packet; and send, via the communication channel, the first updated reply packet to the first local host.

21. The border component of claim 20, wherein the first requested L2 address included in the first reply packet for the first target host is not the target host's real L2 address but rather is an L2 address associated with a communication channel of another border component to which the first target host is coupled.

22. The border component of claim 20, wherein the communication manager is further configured to:

receive, from the network of switches via the communication channel, a second reply packet which is a reply to the second request packet, wherein the second reply packet includes the second L3 address, includes the substitute L2 address as a destination L2 address, includes the second target L3 address, and includes a second requested L2 address for the second target host;

access the data structure;

determine, based at least partially upon the second L3 address in the second reply packet and the second set of information in the data structure, that the destination L2 address for the second reply packet should be the second L2 address;

derive a second updated reply packet from the second reply packet, wherein deriving the second updated reply packet comprises replacing the substitute L2 address with the second L2 address, thereby making the second L2 address the destination L2 address for the second updated reply packet; and send, via the communication channel, the second updated reply packet to the second local host.

23. The border component of claim 18, wherein the first request packet includes an indication that the first request packet is a standard address request packet, and wherein the method further comprises including in the first request packet an indication that the first request packet is a non-standard address request packet.

24. The border component of claim 23, wherein the communication manager is further configured to:

receive, from the first local host coupled to the communication channel, a second request packet requesting a L2 address for the first target host, wherein the second request packet includes the first L2 address as a source L2 address, includes the first L3 address as a sending L3 address, includes the first target L3 address as a target L3 address, includes an indication that the second request packet is a standard address request packet, and includes an indication that the second request packet is to be broadcasted;

determine that the second request packet is a second request from the first local host for a L2 address for the first target host, thereby determining that the first local host has not received a reply to the first request packet;

shield, in response to a determination that the first host has not received a reply to the first updated request packet, the first L2 address from the network of switches by replacing the source L2 address of the second request packet with the substitute L2 address associated with the communication channel of the border component and maintaining an indication in the second request packet that the second updated packet is a standard address request packet; and send, via the communication channel, the second request packet to the network of switches to be broadcasted throughout the network of switches.

25. The border component of claim 20, wherein the first request packet includes an indication that the first request packet is a standard address request packet, and wherein the method further comprises including in the first request packet an indication that the first request packet is a non-standard address request packet.

26. The border component of claim 25, wherein the first reply packet includes an indication that the first reply packet is a non-standard address reply packet, and wherein deriving the first updated reply packet further comprises:

including in the first updated reply packet an indication that the first updated reply packet is a standard address reply packet.

27. A method performed by a border component interposed between a network of switches and a plurality of local hosts, the method comprising:

receiving, by the border component from the network of switches via a communication channel, a request packet requesting a layer 2 (L2) address for a target host of the plurality of local hosts, wherein the target host has a first target layer 3 (L3) address associated therewith, and wherein the request packet includes a first L2 address as a source L2 address, includes a first L3 address as a sending L3 address, includes the first target L3 address as the L3 address for the target host for which a requested L2 address is being requested, includes an indication as to whether the request packet is a standard or non-standard address request packet, and includes an indication that the request packet is to be broadcasted;

determining, by the border component, whether the request packet is a standard address request packet;

in response to a determination, by the border component, that the request packet is a standard address request packet:

broadcasting, by the border component, the request packet to all of the plurality of local hosts coupled to the communication channel;

receiving, by the border component, a first reply packet from the target host, wherein the target host has a target host L2 address associated therewith, and wherein the first reply packet includes the first L3 address, includes the first L2 address as a destination address, includes the first target L3 address, includes the target host L2 address as the requested L2 address for the target host, and includes the target host L2 address as a source L2 address;

shielding, by the border component, the target host L2 address by deriving a first updated reply packet from the first reply packet, wherein deriving the first updated reply packet comprises replacing the source L2 address of the first reply packet with a substitute L2 address associated with the communication channel;

sending, by the border component, the first updated reply packet to the network of switches via the communication channel; and in response to a determination that the request packet is a non-standard address request packet:
  determining whether the target host is a host of the plurality of local hosts coupled to the communication channel;
  in response to an affirmative determination, shielding target host L2 address by deriving a second reply packet from the request packet, wherein deriving the second reply packet comprises replacing the source L2 address of the reply packet with the substitute L2 address associated with the communication channel, inserting substitute L2 address into the second reply packet to represent the requested L2 address for the target host, and making the first L2 address the destination L2 address for the second reply packet; and
  sending the second reply packet to the network of switches via the communication channel.

28. The method of claim 27, wherein the first L2 address, the target host L2 address, and the substitute L2 address comprise media access control (MAC) addresses, and wherein the first L3 address and the first target L3 address comprise Internet Protocol (IP) addresses.

29. The method of claim 27, further comprising:
  obtaining from the first reply packet the first target L3 address and the target host L2 address; and
  updating a data structure to include a set of information indicating an association between the first target L3 address and the target host L2 address.

30. The method of claim 27, wherein the first reply packet includes an indication that the first reply packet is a standard address reply packet, and wherein deriving the first updated reply packet further comprises:
  including an indication in the first updated reply packet that the first updated reply packet is a non-standard address reply packet.

31. The method of claim 27, wherein said determining whether the target host is a host of the plurality of local hosts coupled to the communication channel comprises:
  accessing a data structure; and
  determining whether the data structure includes a set of information that includes the first target L3 address of the target host.

32. The method of claim 27, wherein deriving the second reply packet further comprises:
  including an indication in the second reply packet that the second reply packet is a non-standard address reply packet.

33. The method of claim 27, further comprising:
in response to a determination that the request packet is a non-standard address request packet:
  determining whether the target host is a host of the plurality of local hosts coupled to the communication channel;
  in response to an affirmative determination, deriving an updated request packet from the request packet, wherein deriving the updated request packet comprises including an indication in the updated request packet that the updated request packet is a standard address request packet;
  sending the updated request packet to the target host;
  receiving a second reply packet from the target host, wherein the second reply packet includes the first L3 address, includes the first L2 address as a destination address, includes the first target L3 address, includes the target host L2 address as the requested L2 address for the target host, and includes the target host L2 address as a source L2 address;
  deriving a second updated reply packet from the second reply packet, wherein deriving the second updated reply packet comprises replacing the target host L2 address with the substitute L2 address associated with the communication channel, thereby making the substitute L2 address the requested L2 address for the target host, and making the substitute L2 address the source L2 address for the second updated reply packet; and
  sending the second updated reply packet to the network of switches via the communication channel.

34. The method of claim 33, wherein the second reply packet includes an indication that the second reply packet is a standard address reply packet, and wherein deriving the second updated reply packet further comprises:
  including an indication in the second updated reply packet that the second updated reply packet is a non-standard address reply packet.

35. A border component configured to be interposed between a plurality of local hosts and a network of switches, comprising:
  a communication channel; and
  a communication manager configured to:
    receive, from the network of switches via the communication channel, a request packet requesting a layer 2 (L2) address for a target host, wherein the target host has a first target layer 3 (L3) address associated therewith, and wherein the request packet includes a first L2 address as a source L2 address, includes a first L3 address as a sending L3 address, includes the first target L3 address as the L3 address for the target host for which a requested L2 address is being requested, includes an indication as to whether the request packet is a standard or non-standard address request packet, and includes an indication that the request packet is to be broadcasted;
    determine whether the request packet is a standard address request packet;
    in response to a determination that the request packet is a standard address request packet:
      broadcast the request packet to all of the plurality of local hosts coupled to the communication channel;
      receive a first reply packet from the target host, wherein the target host has a target host L2 address associated therewith, and wherein the first reply packet includes the first L3 address, includes the first L2 address as a destination address, includes the first target L3 address, includes the target host L2 address as the requested L2 address for the target host, and includes the target host L2 address as a source L2 address;
      shield the target host L2 address by deriving a first updated reply packet from the first reply packet, wherein deriving the first updated reply packet comprises replacing the source L2 address of the first reply packet with a substitute L2 address associated with the communication channel; and
      send the first updated reply packet to the network of switches via the communication channel; and
    in response to a determination that the request packet is a non-standard address request packet:
      determine whether the target host is a host of the plurality of local hosts that is coupled to the communication channel;
      in response to an affirmative determination, shielding the target host L2 address by deriving a second reply packet from the request packet, wherein deriving the second reply packet comprises replacing the source L2 address of the reply packet with the substitute L2 address associated with the communication channel, inserting the substitute L2 address into the second reply packet to represent the requested L2 address for the target host, and making the first L2 address the destination L2 address for the second reply packet; and send the second reply packet to the network of switches via the communication channel.

36. The border component of claim 35, wherein the first L2 address, the target host L2 address, and the substitute L2 address comprise media access control (MAC) addresses, and wherein the first L3 address and the first target L3 address comprise Internet Protocol (IP) addresses.

37. The border component of claim 35, wherein the communication manager is further configured to:
   obtain from the first reply packet the first target L3 address and the target host L2 address; and
   update a data structure to include a set of information indicating an association between the first target L3 address and the target host L2 address.

38. The border component of claim 35, wherein the first reply packet includes an indication that the first reply packet is a standard address reply packet, and wherein deriving the first updated reply packet further comprises:
   including an indication in the first updated reply packet that the first updated reply packet is a non-standard address reply packet.

39. The border component of claim 35, wherein determining whether the target host is a host that is coupled to the communication channel comprises:
   accessing a data structure; and
   determining whether the data structure includes a set of information that includes the first target L3 address of the target host.

40. The border component of claim 35, wherein deriving the second reply packet further comprises:
   including an indication in the second reply packet that the second reply packet is a non-standard address reply packet.

41. The border component of claim 35, wherein the communication manager is further configured to:
   in response to a determination that the request packet is a non-standard address request packet:
   determine whether the target host is a host of the plurality of local hosts coupled to the communication channel;
   in response to an affirmative determination, derive an updated request packet from the request packet, wherein deriving the updated request packet comprises including an indication in the updated request packet that the updated request packet is a standard address request packet;
   send the updated request packet to the target host;
   receive a second reply packet from the target host, wherein the second reply packet includes the first L3 address, includes the first L2 address as a destination address, includes the first target L3 address, includes the target host L2 address as the requested L2 address for the target host, and includes the target host L2 address as a source L2 address;
   shielding the target host L2 address by deriving a second updated reply packet from the second reply packet, wherein deriving the second updated reply packet comprises replacing the source L2 address of the second reply packet with the substitute L2 address associated with the communication channel, and making the substitute L2 address the source L2 address for the second updated reply packet; and
   send the second updated reply packet to the network of switches via the communication channel.

42. The border component of claim 41, wherein the second reply packet includes an indication that the second reply packet is a standard address reply packet, and wherein deriving the second updated reply packet further comprises:
   including an indication in the second updated reply packet that the second updated reply packet is a non-standard address reply packet.

43. A method performed by a border component interposed between a network of switches and a plurality of local hosts, the method comprising:
   receiving, by the border component from a first local host of the plurality of local hosts, a first request packet requesting a layer 2 (L2) address for a first target host, wherein the first local host has a first L2 address and a first layer 3 (L3) address associated therewith, wherein the first target host has a first target L3 address associated therewith, and wherein the first request packet includes the first L2 address as a source L2 address, includes the first L3 address as a sending L3 address, includes the first target L3 address as a target L3 address, and includes an indication that the first request packet is to be broadcasted;
   obtaining, by the border component, the first L2 address and the first L3 address associated with the first local host from the first request packet;
   updating, by the border component, a data structure to include a first set of information indicating an association between the first L3 address and the first L2 address;
   shielding, by the border component, the first L2 address from the network of switches by replacing the source L2 address of the firs request packet with a substitute L2 address associated with a communication channel of the border component;
   sending, by the border component, the first request packet to the network of switches to be broadcasted throughout the network of switches;
   receiving, from the first local host, a second request packet requesting a L2 address for the first target host, wherein the second request packet includes the first L2 address as a source L2 address, includes the first L3 address as a sending L3 address, includes the first target L3 address as a target L3 address, includes an indication that the second request packet is a standard address request packet, and includes an indication that the second request packet is to be broadcasted;
   determining that the second request packet is a second request from the first local host for a L2 address for the first target host, thereby determining that the first local host has not received a reply to the first request packet;
   in response to a determination that the first local host has not received a reply to the first request packet, shielding the first L2 address from the network of switches by replacing the source L2 address of the second request packet with the substitute L2 address associated with the communication channel of the border component and maintaining an indication in the second request packet that the second packet is standard address request packet;
   sending the second request packet to the network of switches to be broadcasted throughout the network of switches; and wherein the first request packet includes an indication that the first request packet is a standard address request packet, and wherein deriving the first updated request packet further comprises including in the first request packet an indication that the first request packet is a non-standard address request packet.

44. A border component configured to be interposed between a plurality of local hosts and a network of switches, comprising:
   a communication channel; and
   a communication manager configured to:
      receive, from a first local host of the plurality of local hosts coupled to the communication channel, a first request packet requesting a layer 2 (L2) address for a first target host, wherein the first local host has a first L2 address and a first layer 3 (L3) address associated therewith, wherein the first target host has a first target L3 address associated therewith, and wherein the first request packet includes the first L2 address as a source L2 address, includes the first L3 address as a sending L3 address, includes the first target L3 address as a target L3 address, and includes an indication that the first request packet is to be broadcasted;
      obtain the first L2 address and the first L3 address associated with the first host from the first request packet;
      update a data structure to include a first set of information indicating an association between the first L3 address and the first L2 address;
      shield the first L2 address from the network of switches by replacing the source L2 address of the first request packet with a substitute L2 address associated with a communication channel of the border component;
      send, via the communication channel, the first request packet to the network of switches to be broadcasted throughout the network of switches;
      receive, from the first local host coupled to the communication channel, a second request packet requesting a L2 address for the first target host, wherein the second request packet includes the first L2 address as a source L2 address, includes the first L3 address as a sending L3 address, includes the first target L3 address as a target L3 address, includes an indication that the second request packet is a standard address request packet, and includes an indication that the second request packet is to be broadcasted;
      determine that the second request packet is a second request from the first local host for a L2 address for the first target host, thereby determining that the first local host has not received a reply to the first request packet;
      shield, in response to a determination that the first host has not received a reply to the first updated request packet, the first L2 address from the network of switches by replacing the source L2 address of the second request packet with the substitute L2 address associated with the communication channel of the border component and maintaining an indication in the second request packet that the second updated packet is a standard address request packet;
      send, via the communication channel, the second request packet to the network of switches to be broadcasted throughout the network of switches; and
      wherein the first request packet includes an indication that the first request packet is a standard address request packet, and wherein the method further comprises including in the first request packet an indication that the first request packet is a non-standard address request packet.

45. A method performed by a border component interposed between a network of switches and a plurality of local hosts, the method comprising:
   receiving, by the border component from the network of switches via a communication channel, a request packet requesting a layer 2 (L2) address for a target host of the plurality of local hosts, wherein the target host has a first target layer 3 (L3) address associated therewith, and wherein the request packet includes a first L2 address as a source L2 address, includes a first L3 address as a sending L3 address, includes the first target L3 address as the L3 address for the target host for which a requested L2 address is being requested, includes an indication as to whether the request packet is a standard or non-standard address request packet, and includes an indication that the request packet is to be broadcasted;
   determining, by the border component, whether the request packet is a standard address request packet;
   in response to a determination, by the border component, that the request packet is a standard address request packet:
   broadcasting, by the border component, the request packet to all of the plurality of local hosts coupled to the communication channel;
   receiving, by the border component, a first reply packet from the target host, wherein the target host has a target host L2 address associated therewith, and wherein the first reply packet includes the first L3 address, includes the first L2 address as a destination address, includes the first target L3 address, includes the target host L2 address as the requested L2 address for the target host, and includes the target host L2 address as a source L2 address;
   shielding, by the border component, the target host L2 address by deriving a first updated reply packet from the first reply packet, wherein deriving the first updated reply packet comprises replacing the source L2 address of the first reply packet with a substitute L2 address associated with the communication channel;
   sending, by the border component, the first updated reply packet to the network of switches via the communication channel; and
   in response to a determination that the request packet is a non-standard address request packet:
      determining whether the target host is a host of the plurality of local hosts coupled to the communication channel;
      in response to an affirmative determination, deriving an updated request packet from the request packet, wherein deriving the updated request packet comprises including an indication in the updated request packet that the updated request packet is a standard address request packet;
      sending the updated request packet to the target host;
      receiving a second reply packet from the target host, wherein the second reply packet includes the first L3 address, includes the first L2 address as a destination address, includes the first target L3 address, includes the target host L2 address as the requested L2 address for the target host, and includes the target host L2 address as a source L2 address;
      deriving a second updated reply packet from the second reply packet, wherein deriving the second updated reply packet comprises replacing the target host L2 address with the substitute L2 address associated with the communication channel, thereby making the substitute L2 address the requested L2 address for the target host, and making the substitute L2 address the source L2 address for the second updated reply packet; and sending the second updated reply packet to the network of switches via the communication channel.

46. A border component configured to be interposed between a plurality of local hosts and a network of switches, comprising:

a communication channel; and a communication manager configured to:

receive, from the network of switches via the communication channel, a request packet requesting a layer 2 (L2) address for a target host, wherein the target host has a first target layer 3 (L3) address associated therewith, and wherein the request packet includes a first L2 address as a source L2 address, includes a first L3 address as a sending L3 address, includes the first target L3 address as the L3 address for the target host for which a requested L2 address is being requested, includes an indication as to whether the request packet is a standard or non-standard address request packet, and includes an indication that the request packet is to be broadcasted;

determine whether the request packet is a standard address request packet;

in response to a determination that the request packet is a standard address request packet:

broadcast the request packet to all of the plurality of local hosts coupled to the communication channel;

receive a first reply packet from the target host, wherein the target host has a target host L2 address associated therewith, and wherein the first reply packet includes the first L3 address, includes the first L2 address as a destination address, includes the first target L3 address, includes the target host L2 address as the requested L2 address for the target host, and includes the target host L2 address as a source L2 address;

shield the target host L2 address by deriving a first updated reply packet from the first reply packet, wherein deriving the first updated reply packet comprises replacing the source L2 address of the first reply packet with a substitute L2 address associated with the communication channel;

send the first updated reply packet to the network of switches via the communication channel in response to a determination that the request packet is a non-standard address request packet:

determine whether the target host is a host of the plurality of local hosts coupled to the communication channel;

in response to an affirmative determination, derive an updated request packet from the request packet, wherein deriving the updated request packet comprises including an indication in the updated request packet that the updated request packet is a standard address request packet;

send the updated request packet to the target host;

receive a second reply packet from the target host, wherein the second reply packet includes the first L3 address, includes the first L2 address as a destination address, includes the first target L3 address, includes the target host L2 address as the requested L2 address for the target host, and includes the target host L2 address as a source L2 address;

shielding the target host L2 address by deriving a second updated reply packet from the second reply packet, wherein deriving the second updated reply packet comprises replacing the source L2 address of the second reply packet with the substitute L2 address associated with the communication channel, and making the substitute L2 address the source L2 address for the second updated reply packet; and send the second updated reply packet to the network of switches via the communication channel.

* * * * *

UNITED STATES PATENT AND TRADEMARK OFFICE
CERTIFICATE OF CORRECTION

PATENT NO. : 8,498,293 B2  
APPLICATION NO. : 13/154617  
DATED : July 30, 2013  
INVENTOR(S) : Bert H. Tanaka et al.

Page 1 of 1

It is certified that error appears in the above-identified patent and that said Letters Patent is hereby corrected as shown below:

In the Claims:

Claim 27:

Column 31, Line 6, insert --the-- after "shielding"
Column 31, Line 12, insert --the-- after "inserting"

Signed and Sealed this
Third Day of September, 2013

Teresa Stanek Rea
*Acting Director of the United States Patent and Trademark Office*